United States Patent
Rao et al.

(10) Patent No.: US 12,482,234 B2
(45) Date of Patent: Nov. 25, 2025

(54) PRIVACY-PRESERVING SPLITTING OF NEURAL NETWORK MODELS FOR PREDICTION ACROSS MULTIPLE DEVICES

(71) Applicant: SONY GROUP CORPORATION, Tokyo (JP)

(72) Inventors: Krishna Prasad Agara Venkatesha Rao, Bengaluru (IN); Akshay Shekhar Kadakol, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 255 days.

(21) Appl. No.: 18/348,079

(22) Filed: Jul. 6, 2023

(65) Prior Publication Data
US 2025/0014315 A1    Jan. 9, 2025

(51) Int. Cl.
| | |
|---|---|
| *G06V 10/77* | (2022.01) |
| *G06V 10/74* | (2022.01) |
| *G06V 10/82* | (2022.01) |
| *G06V 10/94* | (2022.01) |
| *G06V 40/16* | (2022.01) |

(52) U.S. Cl.
CPC ........ *G06V 10/7715* (2022.01); *G06V 10/761* (2022.01); *G06V 10/82* (2022.01); *G06V 10/95* (2022.01); *G06V 40/172* (2022.01)

(58) Field of Classification Search
CPC ........ G06N 3/048; G06N 3/08; G06V 10/761; G06V 10/7715; G06V 10/82; G06V 10/95; G06V 40/172
See application file for complete search history.

(56) References Cited

U.S. PATENT DOCUMENTS

| | | | |
|---|---|---|---|
| 12,288,382 B2 * | 4/2025 | Guo | ............ G06N 3/09 |
| 2022/0083807 A1 | 3/2022 | Zhang | |
| 2022/0147654 A1 | 5/2022 | Beach et al. | |

(Continued)

FOREIGN PATENT DOCUMENTS

CN          114817951 A       7/2022

OTHER PUBLICATIONS

Xu et al: "Privacy-Preserving Machine Learning: Methods, Challenges and Directions", 2021 (Year: 2021).*

(Continued)

*Primary Examiner* — Ruiping Li
(74) *Attorney, Agent, or Firm* — CHIP LAW GROUP

(57) ABSTRACT

A first electronic device and a method for implementation for privacy-preserving splitting of neural network (NN) models for prediction across multiple devices is disclosed. The first electronic device applies an NN model on a received input datapoint to determine a set of feature maps. Each feature map is compared with the received input datapoint to determine a first NN sub-model including a first sub-set of NN layers. The determined first NN sub-model is applied on the received input datapoint to determine a first feature map. The first electronic device transmits the determined first feature map and information indicative of a second sub-set of NN layers of a second NN sub-model to a second electronic device. The second NN sub-model is used to determine a prediction output. The first electronic device receives the determined prediction output and controls rendering of the received prediction output on a display device.

20 Claims, 8 Drawing Sheets

(56) References Cited

U.S. PATENT DOCUMENTS

2022/0335153 A1    10/2022  Herman et al.
2022/0414432 A1*   12/2022  Banitalebi Dehkordi ..................
                                                          G06N 3/048
2023/0130021 A1     4/2023  Jitkrittum

OTHER PUBLICATIONS

Hunt et al: "Chiron: Privacy-preserving Machine Learning as a Service", 2018. (Year: 2018).*

* cited by examiner

PRIVACY-PRESERVING SPLITTING OF NEURAL NETWORK MODELS FOR PREDICTION ACROSS MULTIPLE DEVICES

FIELD

Various embodiments of the disclosure relate to data privacy compliant artificial intelligence models. More specifically, various embodiments of the disclosure relate to privacy-preserving splitting of neural network models for prediction across multiple devices.

BACKGROUND

Advancements in the field of artificial intelligence have led to development of different types of machine learning (ML) models that may be used to execute a wide range of machine learning tasks such as voice recognition, face recognition, sentiment analysis, emotion detection, and so on. Execution of such machine learning tasks may require feeding personal data (i.e., personal identifiable information) of users such as text, image, or audio, as input to the ML models. Owing to latency and computational constraints of user-end devices, the ML models may not be deployed on the user-end devices. Thus, execution of the machine learning tasks may require transmission of the personal data to an electronic device, such as a server that may host the ML models. Such transmission, however, may compromise privacy of the personal data. For example, if an image of a user is received by an external device for facial recognition, the external device may, along with an execution of the facial recognition task, identify additional information associated with the user. Thereafter, in certain cases the additional information (which may include private information) may be sold to a third party for revenue.

In order to ensure that data privacy of users is not compromised, the ML models, and pipelines associated with the (existing) ML models, may need to be redesigned or encrypted. However, redesigning of the ML models and/or the pipelines may lead to imposition of additional computational requirements (such as overhead processing) and increase latency that may be involved in generation of results.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for privacy-preserving splitting of neural network models for prediction across multiple devices is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
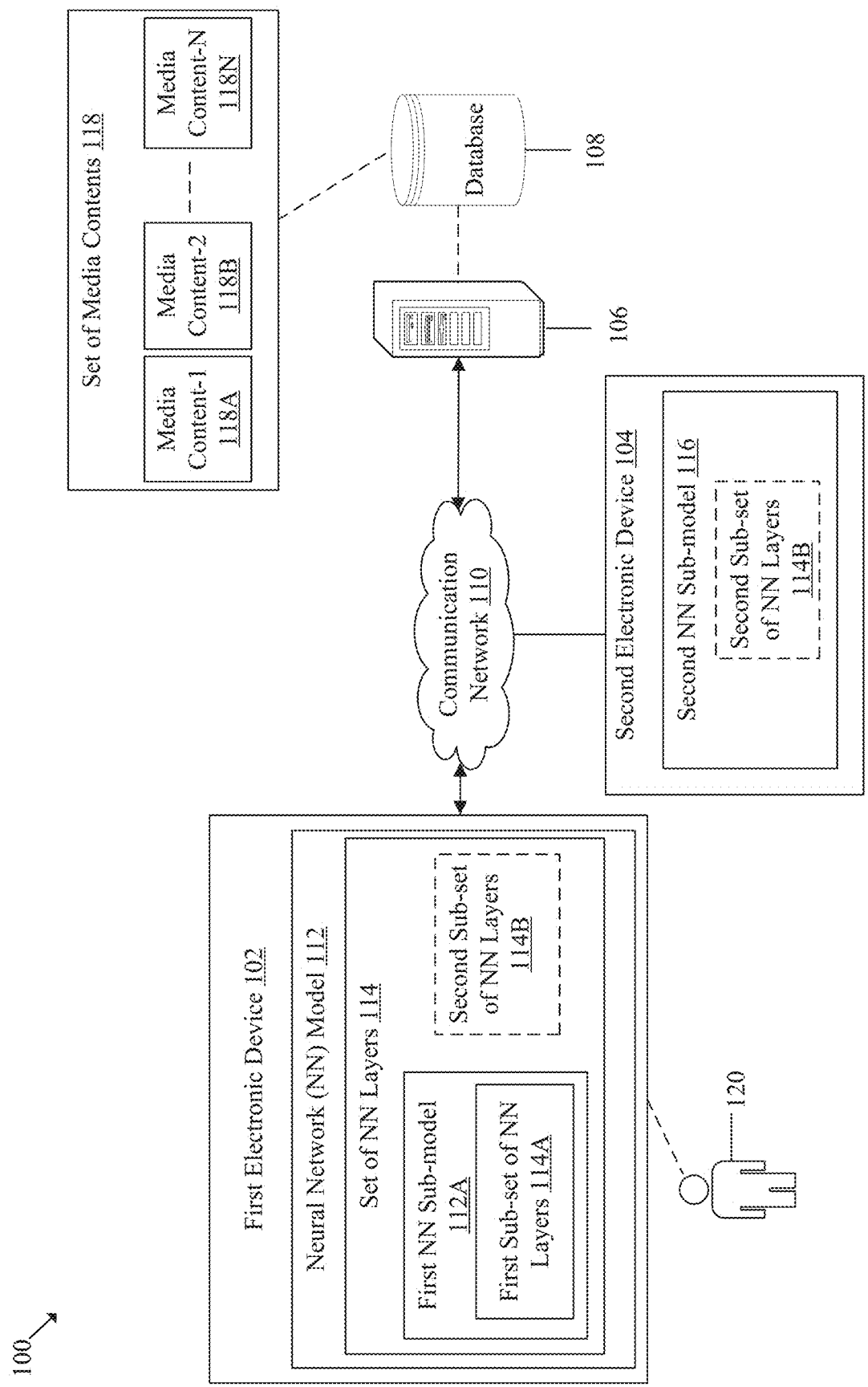
FIG. 1 is a block diagram that illustrates an exemplary network environment for privacy-preserving splitting of neural network (NN) models for prediction across multiple devices, in accordance with an embodiment of the disclosure.

The following described implementation may be found in a first electronic device and method for privacy-preserving splitting of neural network models for prediction across multiple devices. Exemplary aspects of the disclosure may provide a first electronic device (such as a smart phone, a laptop, or a gaming device) that may receive an input datapoint (such as an image, a video file, an audio file, or a text) that may include personal information of a person. Thereafter, the first electronic device may apply a neural network (NN) model on the received input datapoint. Based on the application of the NN model, the first electronic device may determine a set of feature maps from a set of NN layers of the NN model. The first electronic device may compare each feature map of the determined set of feature maps with the received input datapoint. The first electronic device may determine a first NN sub-model that may include a first sub-set of NN layers of the set of NN layers, based on the comparison. The first electronic device may apply the determined first NN sub-model on the received input datapoint. The first electronic device may determine a first feature map based on the applied first NN sub-model. The first electronic device may transmit the determined first feature map and information indicative of a second sub-set of NN layers of a second NN sub-model to a second electronic device. The second sub-set of NN layers may correspond to NN layers other than the first sub-set of NN layers of the NN model. The second NN sub-model may be applied on the transmitted first feature map to determine a prediction output for the received input datapoint. The first electronic device may receive the determined prediction output from the second electronic device. The first electronic device may control rendering of the received prediction output on a display device.

Typically, user-end devices, with memory and processing constraints, may not host machine learning (ML) models that may be capable of executing ML tasks such as voice recognition, face recognition, emotion detection, and so on. Therefore, the user-end devices may transmit information (such as an image of the face of a user), required for execution of such ML tasks, to an external device that may host the ML models configured to execute the ML tasks. The transmitted information may include personal identifiable information (PII) associated with end-users, and, hence, such transmissions may compromise privacy of the end-users. For example, for execution of an emotion recognition task, a user-end device may transmit an image that may include the face of a user (of the user-end device) to a cloud-based server. The cloud-based server may perform the emotion recognition task based on an application of an ML model, hosted in the cloud-based server, on the received image and may transmit a result (i.e., the detected emotion) of the ML model to the user-end device. However, in certain cases, the cloud-based server may extract additional information, such as facial data or preferences, from the received image. The cloud-based server may create a database to store the extracted additional information or may sell the extracted additional information to a third-party for monetary benefits. Further, the PII may be prone to theft or snooping if a link, via which the PII is transmitted to external device, is compromised (due to hacking). Thus, the privacy of the PII may be compromised based on the abovementioned scenarios.

In order to prevent any potential compromise of privacy or theft of the PII ML models or pipelines associated with the ML models may need to be redesigned completely or be encrypted. Redesigning the ML models and/or the associated pipelines may lead to an increase in computational load such as processing of additional overhead and an increase in latency involved in obtaining a prediction result. Moreover, performance of the redesigned ML models may be lower than those of the original ML models.

In order to address the aforesaid issues, the disclosed first electronic device may split a neural network (NN) model (or ML models) that may receive PII, associated with a user, as an input. The NN model may be split across multiple devices, based on number of layers of the NN model and a feature map that may be generated by each NN layer of the NN model. The splitting may be such that preservation of privacy of the PII may be ensured if certain NN layers of the NN model, which are associated with PII of the user, are deployed in local user-devices and the remaining NN layers are deployed in a remote device. For such splitting, the first electronic device may determine a critical NN layer of the NN model. The critical NN layer may be one of the NN layers of a set of NN layers of the NN model. The feature map determined by the critical NN layer, or a NN layer succeeding the critical NN layer, may be such that reconstruction of the PII from a feature map generated by the critical NN layer or any NN layer succeeding the critical NN layer may not be possible. Based on the determined critical NN layer, the first electronic device may split the NN model into a set of NN sub-models (for example, the first NN sub-model and the second NN sub-model). A sub-model (for example, the first NN sub-model) may receive the PII and may be executed on the first electronic device. Herein, the first electronic device may be the user-end device associated with the user. The second electronic device may process data (such as, the first feature map transmitted from the first electronic device) that may not include PII or features that may be used to reconstruct the PII. Herein, the second electronic device may be a remote system. Thus, privacy of a person including the PII may be ensured and any potential theft of the PII may be eliminated. Moreover, the requirement to redesign or retrain an existing NN model, to ensure the privacy of the PII, may be done away with. Furthermore, the splitting of the NN model into the first NN sub-model and the second NN sub-model may not result in degradation of an accuracy of the NN model. That is, the prediction output determined from the second NN sub-model may be similar to a prediction output that may be determined from the NN model for the PII. The disclosed first electronic device may be used for applications such as, but not limited to, vision analytics, user analytics, audio analytics, and data analytics.

FIG. 1 is a block diagram that illustrates an exemplary network environment for privacy-preserving splitting of neural network models for prediction across multiple devices, in accordance with an embodiment of the disclosure. With reference to FIG. 1, there is shown a network environment 100. The network environment 100 may include a first electronic device 102, a second electronic device 104, a server 106, a database 108, and a communication network 110. The first electronic device 102 may communicate with the second electronic device 104, and the server 106 through one or more networks (such as the communication network 110). The first electronic device 102 may include a neural network (NN) model 112. The NN model 112 may include a set of NN layers 114. The set of NN layers 114 may include a first sub-set of NN layers 114A and a second sub-set of NN layers 114B. The first sub-set of NN layers 114A may constitute a first NN sub-model 112A. The second electronic device 104 may include a second NN sub-model 116 that may include the second sub-set of NN layers 114B. In FIG. 1, there is further shown a set of media contents 118 that may be stored in the database 108. The set of media contents 118 may include a media content-1 118A, a media content-2 118B, . . . , and a media content-N 118N. There is further shown a user 120, who may be associated with, or may operate, the first electronic device 102.

The N number of media contents shown in FIG. 1 are presented merely as an example. The database 108 may include only two or more than N media contents, without deviation from the scope of the disclosure. For the sake of brevity, only N media contents have been shown in FIG. 1. However, in some embodiments, there may be more than N media contents without limiting the scope of the disclosure.

The first electronic device 102 may include suitable logic, circuitry, interfaces, and/or code that may be configured to receive an input datapoint including personal information of a person. The first electronic device 102 may apply the NN model 112 on the received input datapoint. The first electronic device 102 may determine a set of feature maps from the set of NN layers 114 of the NN model 112, based on the application of the NN model 112. The first electronic device 102 may compare each feature map of the determined set of feature maps with the received input datapoint. The first electronic device 102 may determine the first NN sub-model 112A including the first sub-set of NN layers 114A of the set of NN layers 114, based on the comparison. The first electronic device 102 may apply the determined first NN sub-model 112A on the received input datapoint. The first electronic device 102 may determine a first feature map based on the applied first NN sub-model 112A. The first electronic device 102 may transmit the determined first feature map and information indicative of the second sub-set of NN layers 114B of the second NN sub-model 116 to the second electronic device 104. The second sub-set of NN layers 114B may correspond to NN layers that are different from the first sub-set of NN layers 114A of the NN model 112. The second NN sub-model 116 may be applied on the transmitted first feature map to determine a prediction output for the received input datapoint. The first electronic device 102 may receive the determined prediction output from the second electronic device 104. The first electronic device 102 may control rendering of the received prediction output on a display device.

In an embodiment, the first electronic device 102 may be an end-user device, which may be a local computing device of the user 120. Examples of the first electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The second electronic device 104 may include suitable logic, circuitry, interfaces, and/or code that may be configured to receive the determined first feature map and information indicative of the second sub-set of NN layers 114B of the second NN sub-model 116 from the first electronic device 102. In an embodiment, the second electronic device 104 may generate the second NN sub-model 116 based on the information indicative of the second sub-set of NN layers 114B that may be received from the first electronic device 102. The second electronic device 104 may determine the prediction output based on the application of the second NN sub-model 116 on the transmitted first feature map. The second electronic device 104 may transmit the determined prediction output from the first electronic device 102.

In an embodiment, the second electronic device 104 may be a remote device, such as, a server, which may be an external device communicatively coupled to the first electronic device 102 of the user 120. Examples of the second electronic device 104 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The server 106 may include suitable logic, circuitry, and interfaces, and/or code that may be configured to receive the determined first feature map and information indicative of the second sub-set of NN layers 114B from the first electronic device 102. The server 106 may generate the second NN sub-model 116 based on the received information indicative of the second sub-set of NN layers 114B. The second sub-set of NN layers 114B may correspond to NN layers other than the first sub-set of NN layers 114A (constituting the first NN sub-model 112A) of the NN model 112. The second NN sub-model 116 may be applied on the first feature map. The server 106 may determine the prediction output based on the application of the second NN sub-model 116. The server 106 may transmit the determined prediction output to the first electronic device 102.

The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the first electronic device 102, as two separate entities. In certain embodiments, the functionalities of the server 106 can be incorporated in its entirety or at least partially in the first electronic device 102 without a departure from the scope of the disclosure. In certain embodiments, the server 106 may host the database 108. Alternatively, the server 106 may be separate from the database 108 and may be communicatively coupled to the database 108.

The database 108 may include suitable logic, interfaces, and/or code that may be configured to store the set of media contents 118. The database 108 may be derived from data off a relational or non-relational database, or a set of comma-separated values (csv) files in conventional or big-data storage. The database 108 may be stored or cached on a device, such as a server (e.g., the server 106) or the first electronic device 102. The device storing the database 108 may be configured to receive a query for media content from the first electronic device 102. In response, the device of the database 108 may be configured to retrieve and provide the queried media content to the first electronic device 102, based on the received query.

In some embodiments, the database 108 may be hosted on a plurality of servers stored at the same or different locations. The operations of the database 108 may be executed using hardware including a processor, a microprocessor (e.g., to perform or control performance of one or more operations), a field-programmable gate array (FPGA), or an application-specific integrated circuit (ASIC). In some other instances, the database 108 may be implemented using software.

The communication network 110 may include a communication medium through which the first electronic device 102, the second electronic device 104, and the server 106 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The NN model 112 may be an ML model, which may be trained to determine the set of feature maps from the set of NN layers 114 of the NN model 112. The NN model 112 may be a computational network or a system of artificial neurons, arranged in the set of NN layers 114, as nodes. The set of NN layers 114 of the NN model 112 may include an input NN layer, one or more hidden NN layers, and an output NN layer. Each layer of the set of NN layers 114 may include one or more nodes (or artificial neurons, represented by circles, for example). Outputs of all nodes in the input NN layer may be coupled to at least one node of hidden NN layer(s). Similarly, inputs of each hidden NN layer may be coupled to outputs of at least one node in other layers of the NN model 112. Outputs of each hidden NN layer may be coupled to inputs of at least one node in other NN layers of the NN model 112. Node(s) in the final NN layer may receive inputs from at least one hidden NN layer to output a result. The number of NN layers and the number of nodes in each NN layer may be determined from hyper-parameters of the NN model 112. Such hyper-parameters may be set before, while training, or after training the NN model 112 on a training dataset.

Each node of the NN model 112 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other NN layer(s) (e.g., previous NN layer(s)) of the neural network. All or some of the nodes of the neural network may correspond to same or a different same mathematical function.

In training of the NN model 112, one or more parameters of each node of the neural network may be updated based on whether an output of the final NN layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The NN model 112 may include electronic data, which may be implemented as, for example, a software component of an application executable on the first electronic device 102 or the second electronic device 104. The NN model 112 may rely on libraries, external scripts, or other logic/instructions for execution by a processing device, such as, the first electronic device 102 or the second electronic device 104. The NN model 112 may include code and routines configured to enable a computing device, such as the first electronic device 102 or the second electronic device 104 to perform one or more operations for determination of the set of feature maps from the set of NN layers 114 of the NN model 112. Additionally, or alternatively, the NN model 112 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

The first NN sub-model 112A may be a sub-model of the NN model 112 and may include the first sub-set of NN layers 114A of the set of NN layers 114. The first NN sub-model 112A may be applied on the received input datapoint to determine a first feature map. The first NN sub-model 112A may be stored on the first electronic device 102. Details related to the first NN sub-model 112A may be similar to the NN model 112 without a departure from the scope of the disclosure.

The second NN sub-model 116 may be another sub-model of the NN model 112 and may include the second sub-set of NN layers 114B that may correspond to NN layers other than the first sub-set of NN layers 114A. The second NN sub-model 116 may be applied on the first feature map to determine the prediction output for the received input datapoint. The second NN sub-model 116 may, thus, be associated with non-personal information and may be stored on the second electronic device 104. Details related to the second NN sub-model 116 may be similar to the NN model 112 without departure from the scope of the disclosure.

A pre-trained face recognition neural network (not shown) may be a NN model that may recognize the face of a person in an input data (for example, the input datapoint, a feature map, and the like). In an embodiment, the pre-trained face recognition neural network may be used for performance of a constructability test. Herein, the pre-trained face recognition neural network may be applied on the received input datapoint for recognition of a reference face of the person from the received input datapoint. Thereafter, a re-sized set of feature maps may be applied to the pre-trained face recognition neural network for recognition of a face from each of the re-sized set of feature maps. The first electronic device 102 may compare the reference face with the face recognized from each of the re-sized set of feature maps to determine a degree of similarity between each of the re-sized set of feature maps and the received input datapoint.

In an embodiment, the NN model 112, the first NN sub-model 112A, and the second NN sub-model 116 may be ML models. Each ML model may be a classifier or a prediction model which may be trained to identify a relationship between inputs, such as features in a training dataset and output labels, such as, the prediction output. Each ML model may be defined by its hyper-parameters, for example, number of weights, cost function, input size, number of layers, and the like. The parameters of each ML model may be tuned, and weights may be updated so as to move towards a global minima of a cost function for each ML model. After several epochs of the training on the feature information in the training dataset, each ML model may be trained to output a prediction/classification result for a set of inputs. The prediction result may be indicative of a class label for each input of the set of inputs (e.g., input features extracted from new/unseen instances).

Each ML model may include electronic data, which may be implemented as, for example, a software component of an application executable on the first electronic device 102 or the second electronic device 104. Each ML model may rely on libraries, external scripts, or other logic/instructions for execution by a processing device, such as, the first electronic device 102 or the second electronic device 104. Each ML model may include code and routines configured to enable a computing device, such as the first electronic device 102 or the second electronic device 104 to perform one or more operations such as, determination of the first feature map and the prediction output. Additionally, or alternatively, each ML model may be implemented using hardware including a processor, a microprocessor (e.g., to perform or control performance of one or more operations), a field-programmable gate array (FPGA), or an application-specific integrated circuit (ASIC). Alternatively, in some embodiments, each ML model may be implemented using a combination of hardware and software.

The set of media contents 118 may include images, text files, videos, audios, closed captions, and the like, that may correspond to the personal information associated with one or more persons such as, the user 120. Further, the set of media contents 118 may be stored in the database 108. The first electronic device 102 may query for the input datapoint such as, the media content-1 118A. The server 106 may retrieve the queried input datapoint from the database 108 and transmit the retrieved input datapoint to the first electronic device 102.

In operation, the first electronic device 102 may be configured to receive the input datapoint, such as the media content-1 118A. The input datapoint may include personal information of a person (for example, the user 120). In an embodiment, the first electronic device 102 may receive the input datapoint based on a user input received from the user 120. In another embodiment, the first electronic device 102 may receive the input datapoint from the database 108. For example, the first electronic device 102 may receive the media content-1 118A as the input datapoint from the database 108. Details related to the reception of the input datapoint are further described, for example, in FIG. 4.

The first electronic device 102 may be further configured to apply the NN model 112 on the received input datapoint. Herein, the received input datapoint may be fed to the input NN layer of the NN model 112. The NN model 112 may process the input datapoint and generate an output based on the input datapoint. Details related to the application of the NN model 112 on the received input datapoint are further described, for example, in FIG. 4.

The first electronic device 102 may be further configured to determine a set of feature maps from the set of NN layers 114 of the NN model 112, based on the application of the NN model 112. It may be appreciated that a feature map may provide a mapping of positions, in the received input datapoint, where a set of features may be located. Each NN layer of the set of layers 114 may generate a feature map (as an output) of the set of feature maps. Further, each NN layer, apart from the input NN layer of the NN model 112, may receive a feature map (of the set of feature maps) as an input. The input feature map may be received from an NN layer preceding a corresponding NN layer. Details related to the determination of the set of feature maps are further described, for example, in FIG. 4 (at 406).

Upon determination of the set of feature maps, the first electronic device 102 may compare each feature map of the determined set of feature maps with the received input datapoint. The first electronic device 102 may compare each feature map of the determined set of feature maps with the received input datapoint. Based on each comparison, a degree of similarity between each feature map and the input datapoint may be determined. The degree of similarity between the input datapoint and a feature map determined as an output of a NN layer farther from the input NN layer may be lower compared to that between the input datapoint and a feature map determined as an output of a NN layer closer to the input NN layer. Details related to the determination of the set of feature maps are further described, for example, in FIG. 4 (at 408).

The first electronic device 102 may be further configured to determine the first NN sub-model 112A including the first sub-set of NN layers 114A of the set of NN layers 114, based on the comparison. The first electronic device 102 may determine a critical NN layer for which a degree of similarity of a feature map of the set of feature maps, generated as an output of the critical NN layer, with the input datapoint may be less than, or close to, a predefined threshold. Based on the determination of the critical NN layer, the first electronic device 102 may split the NN model 112 such that the critical NN layer is included in the first sub-set of NN layers 114A and is the last NN layer of the first sub-set of NN layers 114A. Thus, the feature map generated as the output of the critical NN layer may correspond to an output of the first NN sub-model 112A. Details related to determination of the first NN sub-model 112A are further described, for example, in FIG. 4 (at 410).

Upon determination of the first NN sub-model 112A, the first electronic device 102 may be further configured to apply the determined first NN sub-model 112A on the received input datapoint. Herein, the received input datapoint may be applied to the input NN layer of the first NN sub-model 112A (or the NN model 112). Details related to the application of the first NN sub-model 112A are further described, for example, in FIG. 4 (at 412).

Based on the application of the first NN sub-model 112A, the first electronic device 102 may be further configured to determine the first feature map. The first feature map may be generated as an output of an output NN layer of the first NN sub-model 112A (or the last NN layer of the first sub-set of NN layers 114A). Retrieval or reconstruction of the personal information associated with the user 120 from the first feature map may not be possible. This may be because, degree of similarity of the determined first feature map with the input datapoint may be less than the predefined threshold. Details related to the determination of the first feature map are further described, for example, in FIG. 4 (at 414).

The first electronic device 102 may be further configured to transmit, to the second electronic device 104, the determined first feature map and information indicative of the second sub-set of NN layers 114B of the second NN sub-model 116. The second sub-set of NN layers 114B may correspond to NN layers other than the first sub-set of NN layers 114A of the NN model 112. The second NN sub-model 116 may be created based on the information indicative of the second sub-set of NN layers 114B. The second sub-set of NN layers 114B may constitute the second NN sub-model 116. The second NN sub-model 116 may be applied on the transmitted first feature map to determine the prediction output for the received input datapoint. The determined first feature map and the information indicative of the second sub-set of NN layers 114B of the second NN sub-model 116 may be transmitted to the second electronic device 104 since it may not be possible to retrieve or reconstruct the personal information from the determined first feature map. The first feature map may be fed as an input to the input NN layer of the second NN sub-model 116 for the determination of the prediction output. Details related to the transmission of the first feature map and the information are further described, for example, in FIG. 4 (at 416).

The first electronic device 102 may be further configured to receive the determined prediction output from the second electronic device 104. Upon receipt of the first feature map and the information indicative of the second sub-set of NN layers 114B, the second electronic device 104 may create the second NN sub-model 116. Thereafter, the second electronic device 104 may apply the created second NN sub-model 116 on the received first feature map to determine a prediction output. The second electronic device 104 may then transmit the determined prediction output to the first electronic device 102. Details related to the reception of the prediction output are further described, for example, in FIG. 4 (at 418).

The first electronic device 102 may be further configured to control rendering of the received prediction output on a display device. In an example, the prediction output may correspond to a product recommendation for the user 120. Herein, the recommended product may be displayed on a display device. Details related to the rendering of the received prediction output are further described, for example, in FIG. 4 (at 420).

Figure 2:
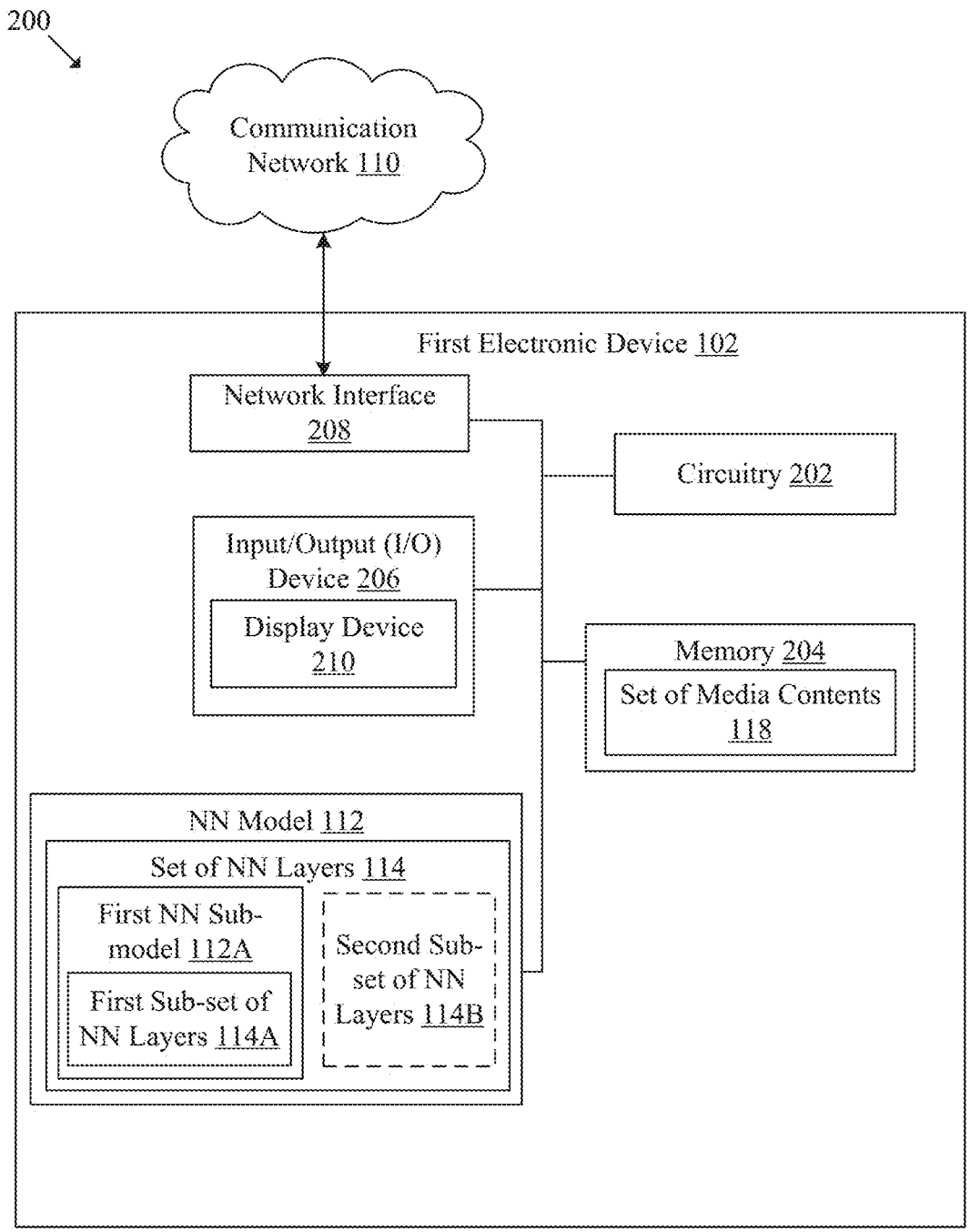
FIG. 2 is a block diagram that illustrates an exemplary first electronic device of FIG. 1, in accordance with an embodiment of the disclosure.

FIG. 2 is a block diagram that illustrates an exemplary first electronic device of FIG. 1, in accordance with an embodiment of the disclosure. FIG. 2 is explained in conjunction with elements from FIG. 1. With reference to FIG. 2, there is shown the exemplary first electronic device 102. The first electronic device 102 may include circuitry 202, a memory 204, an input/output (I/O) device 206, a network interface 208, and the NN model 112. The memory 204 may store the set of media contents 118. The input/output (I/O) device 206 may include a display device 210. The NN model 112 may include the set of NN layers 114. The set of NN layers 114 may include the first sub-set of NN layers 114A and the second sub-set of NN layers 114B.

The circuitry 202 may include suitable logic, circuitry, and/or interfaces that may be configured to execute program instructions associated with different operations to be executed by the first electronic device 102. The operations may include a datapoint reception, a NN model application, a set of feature maps determination, a first NN sub-model determination, a first feature map determination, a feature map transmission, and a prediction output reception. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the first electronic device 102). The memory 204 may be further configured to store the set of media contents 118. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of the input datapoint. The I/O device 206 may be further configured to display or render the prediction output. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the first electronic device 102, the second electronic device 104, and the server 106, via the communication network 110. The network interface 208 may be implemented by use of various known technologies to support wired or wireless communication of the first electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the received prediction output. The display device 210 may be a touch screen which may enable a user (e.g., the user 120) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for privacy-preserving splitting of neural network models for prediction across multiple devices are described further, for example, in FIG. 4.

Figure 3:
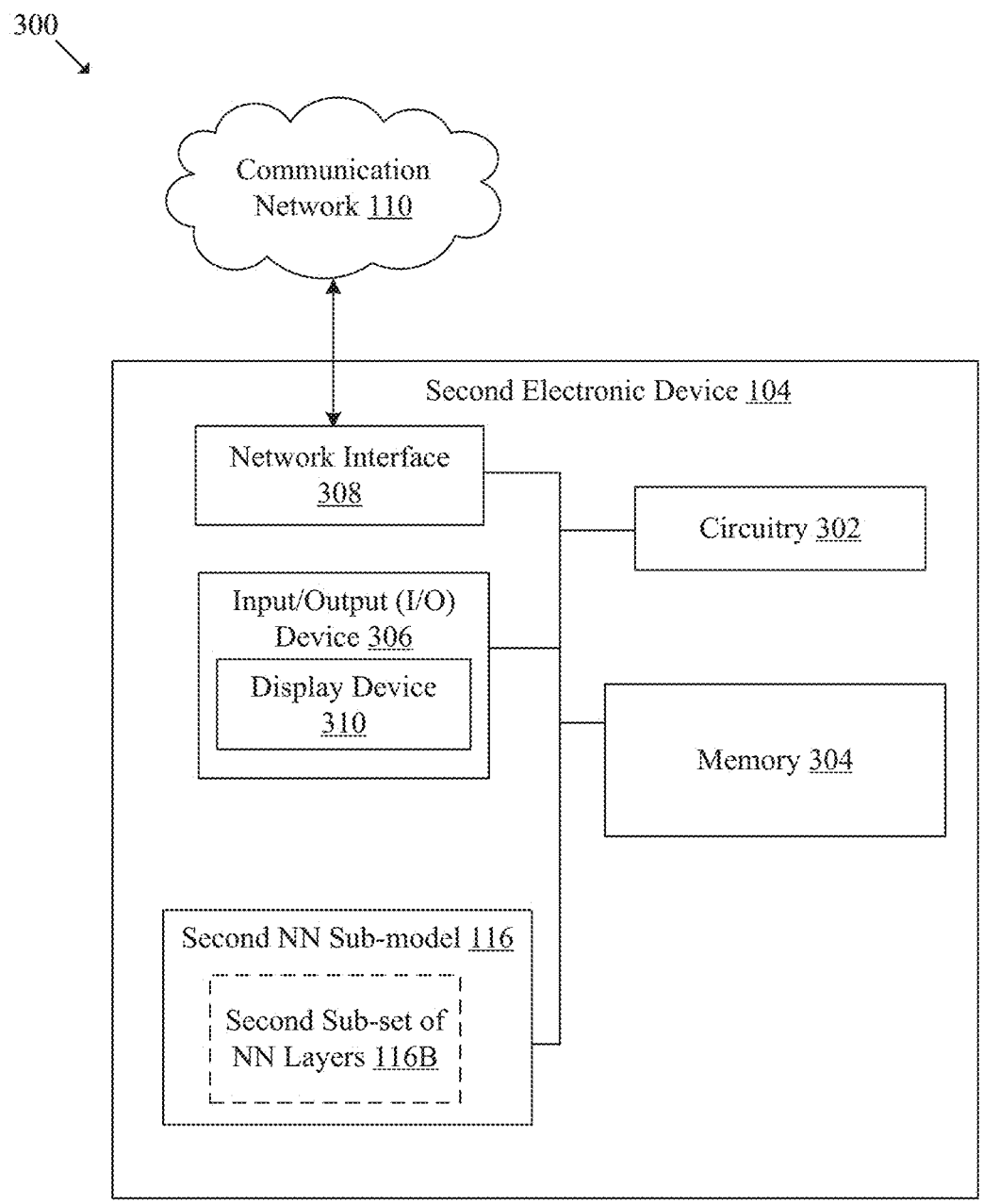
FIG. 3 is a block diagram that illustrates an exemplary second electronic device of FIG. 1, in accordance with an embodiment of the disclosure.

FIG. 3 is a block diagram that illustrates an exemplary second electronic device of FIG. 1, in accordance with an embodiment of the disclosure. FIG. 2 is explained in conjunction with elements from FIG. 1. With reference to FIG. 2, there is shown the exemplary second electronic device, such as, the second electronic device 104 (or the server 106). The second electronic device 104 may include circuitry 302, a memory 304, an input/output (I/O) device 306, a network interface 308, and the second NN sub-model 116. The second NN sub-model 116 may include the second sub-set of NN layers 114B. The input/output (I/O) device 206 may include a display device 310.

The circuitry 302 may include suitable logic, circuitry, and/or interfaces that may be configured to execute program instructions associated with different operations to be executed by the second electronic device 104. The operations may include reception of first feature map from the first electronic device 102, application of the second NN sub-model 116 on the first feature map received from the first electronic device 102, prediction output determination, transmission of the prediction output to the first electronic device 102, and the like. The details of the circuitry 302 of the second electronic device 104 may be same as the details of the circuitry 202 of the first electronic device 102 described, for example, in FIG. 2. Therefore, the description of the circuitry 302 of the second electronic device 104 is omitted from the disclosure for the sake of brevity.

The memory 304 may include suitable logic, circuitry, interfaces, and/or code that may be configured to store one or more instructions to be executed by the circuitry 302. The one or more instructions stored in the memory 304 may be configured to execute the different operations of the circuitry 302 (and/or the second electronic device 104). The memory 304 may be further configured to store the second NN sub-model 116 and the first feature map. The details of the memory 304 may be same as the details of the memory 204 described, for example, in FIG. 2. Therefore, the description of the memory 304 is omitted from the disclosure for the sake of brevity.

The I/O device 306 may include suitable logic, circuitry, interfaces, and/or code that may be configured to receive an input and provide an output based on the received input. For example, the I/O device 306 may receive a second user input indicative of a request for determination of the prediction output. The I/O device 306 may be further configured to display or render the prediction output. The I/O device 306 may include the display device 310. The details of the I/O device 306 may be same as the details of the I/O device 206 described, for example, in FIG. 2. Therefore, the description of the I/O device 306 is omitted from the disclosure for the sake of brevity.

The network interface 308 may include suitable logic, circuitry, interfaces, and/or code that may be configured to facilitate communication between the first electronic device 102, the second electronic device 104, and the server 106, via the communication network 110. The details of the network interface 308 may be same as the details of the network interface 208 described, for example, in FIG. 2. Therefore, the description of the network interface 308 is omitted from the disclosure for the sake of brevity.

The display device 310 may include suitable logic, circuitry, and interfaces that may be configured to display or render the received prediction output. The details of the display device 310 may be same as the details of the display device 210 described, for example, in FIG. 2. Therefore, the description of the display device 310 is omitted from the disclosure for the sake of brevity. Various operations of the circuitry 302 for privacy-preserving splitting of neural network models for prediction across multiple devices are described further, for example, in FIG. 4.

Figure 4:
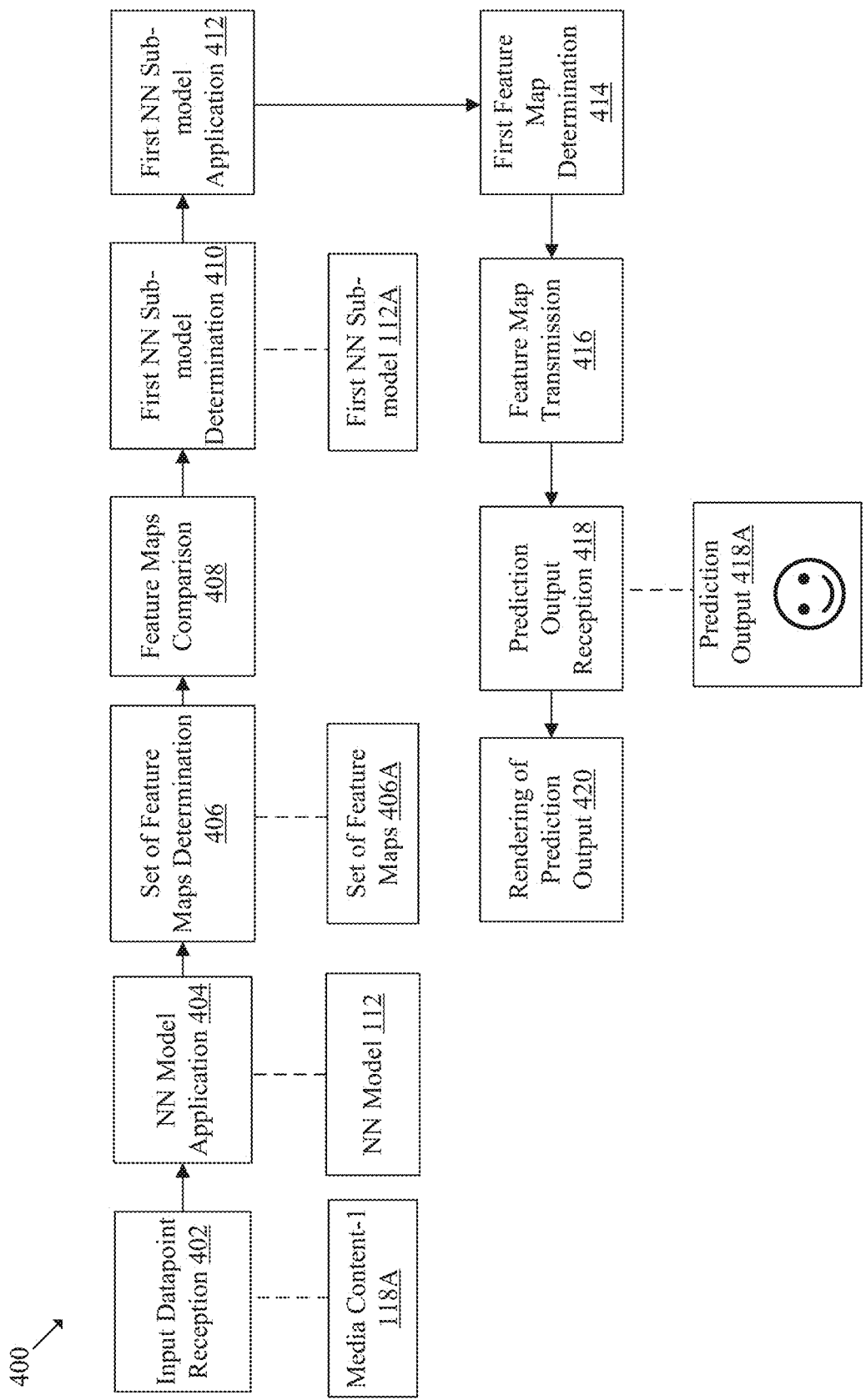
FIG. 4 is a diagram that illustrates an exemplary processing pipeline for privacy-preserving splitting of neural network models for prediction across multiple devices, in accordance with an embodiment of the disclosure.

FIG. 4 is a diagram that illustrates an exemplary processing pipeline for privacy-preserving splitting of neural network models for prediction across multiple devices, in accordance with an embodiment of the disclosure. FIG. 4 is explained in conjunction with elements from FIG. 1, FIG. 2, and FIG. 3. With reference to FIG. 4, there is shown an exemplary processing pipeline 400 that illustrates exemplary operations from 402 to 420 for privacy-preserving splitting of neural network models for prediction across multiple devices. The exemplary operations 402 to 420 may be executed by any computing system, for example, by the first electronic device 102 of FIG. 1 or by the circuitry 202 of FIG. 2. FIG. 4 further includes the NN model 112, a set of feature maps 406A, the first NN sub-model 112A, and a prediction output 418A.

At 402, an operation of input datapoint reception may be executed. The circuitry 202 may be configured to receive the input datapoint (e.g., the media content-1 118A) including personal information of the person, such as the user 120. It may be appreciated that the personal information may include any information that may be used to identify the person. Example, of the personal information may include, but is not limited to, an individual's name, a signature of the individual, an address of the individual, a phone number of the individual, a social security number of the individual, an image of the of the individual, a video of the of the individual, and an audio of the of the individual.

In an embodiment, the received input datapoint may correspond to at least one of image data, video data, textual data, or audio data. The image data may correspond to, for example, one or more images of the user 120. The video data may correspond to, for example, one or more videos of the user 120. The audio data may correspond to, for example, an audio recording (e.g., a voice sample) of the user 120. The textual data may correspond to, for example, a text file including a name, an address, an identification number, and the like, of the user 120. In some cases, the received input datapoint may also correspond to closed captions data including the personal information.

In an embodiment, the input datapoint may be received based on a user input from the user 120. For example, the input datapoint may be an image of the user 120, which may be captured using a camera associated with the first electronic device 102 and received based on a user input from the user 120. In another embodiment, the input datapoint may be stored in the database 108. In such cases the input datapoint may be retrieved from the database 108. For example, the first electronic device 102 may query the database 108, via the server 106, for the media content-1 118A which may include personal information of the user 120. The database 108 may provide the queried media content-1 118A to the first electronic device 102, via the server 106. Herein, the media content-1 118A may correspond to the input datapoint.

In an embodiment, the personal information corresponding to the received input datapoint may be stored on the first electronic device 102. In some scenarios, the personal information may be sensitive and, hence, may need to be secured to prevent potential theft of the personal information. In such scenarios, the personal information may be stored in the first electronic device 102 since the first electronic device 102 may be associated with or owned by the person, for example, the user 120. Further, the storage of the personal information, corresponding to the received input datapoint, in the first electronic device 102 may prevent theft of the personal information which might occur during transmission of the personal information to another device, for example, the server 106. In case the personal information is stored (or is required to be stored) on another device, such as the server 106, then data protection mechanisms may need to be employed to prevent theft of the personal information from the server 106.

At 404, an operation of NN model application may be executed. The circuitry 202 may be configured to apply the NN model 112 on the received input datapoint. As discussed, the NN model 112 may be the computational network or the system of artificial neurons, arranged in the set of NN layers 114, as nodes. The set of NN layers 114 of the NN model 112 may include the input NN layer, one or more hidden NN layers, and the output NN layer. In an example, the received input datapoint may correspond to image data associated with the user 120. The image data may be fed as an input to the input NN layer of the NN model 112. The NN model 112 may then process the image data and provide an output based on received image data.

At 406, an operation of determination of a set of feature maps determination may be executed. The circuitry 202 may be configured to determine the set of feature maps 406A from the set of NN layers 114 of the NN model 112, based on the application of the NN model 112. Upon application of the NN model 112 on the received input datapoint, one or more feature maps of the set of feature maps 406A may be determined from each layer of the set of NN layers 114. In an example, the received input datapoint may be the image data of the user 120. Herein, each feature map of the set of feature maps 406A may provide a mapping of positions in which a set of features such as, edges, objects, corners, textures, straight lines, background, and the like may be located in the image data. In another example, the received input datapoint may an audio data associated with the user 120. Herein, each feature map of the set of feature maps 406A may provide a mapping of timestamps at which a set of features, such as beat, rhythm, timbre pitch, harmony, melody, key, chords, mood, fluctuation pattern, and the like, may be located in a playback timeline of the audio data.

In an embodiment, a first feature map of the set of feature maps 406A may be determined as an output of the input NN layer (or a first NN layer) of the NN model 112, based on an application of the input NN layer of the NN model 112 on the received input datapoint. The first feature map may be fed as an input to a second NN layer of the NN model 112 that may succeed the input NN layer (or the first layer NN). The second NN layer may generate a second feature map of the set of feature maps 406A as an output. Similarly, an Nth NN layer of the NN model 112 may generate an Nth feature map of the set of feature maps 406A.

At 408, an operation of feature maps comparison may be executed. The circuitry 202 may be configured to compare each feature map of the determined set of feature maps 406A with the received input datapoint. It may be appreciated that the NN model 112 may be, fundamentally, a set of mathematical operations performed in sequence. Therefore, the determination of the set of feature maps 406A, based on the application of the NN model 112 on the input datapoint, may represent a sequence of mathematical operations. Mathematical operations, such as, a matrix multiplication of two or more matrices, may be theoretically reversible based on computation of an inverse of a product matrix. However, operations such as an application of a non-linear activation function or pooling on inputs, such as the input datapoint (for the input NN layer) or the feature maps of the set of feature maps 406A (for the subsequent NN layers), may lead to compression of information associated with the input datapoint or the input feature maps. Such compression may render impossible computation of the received input datapoint from a compressed output (such as feature maps of the set of feature maps 406A generated as outputs of the set of NN layers 114).

Therefore, it may be appreciated that similarity between the feature maps of the set of feature maps 406A and the input datapoint may reduce for NN layers of the NN model 112 farther from the input NN layer due to compounding effects of the compression at each NN layer. That is, the features maps determined as outputs of the NN layers of the NN model 112 closer to the input NN layer may be similar to the input datapoint. Based on the similarity of the input datapoint to a feature map, the input datapoint may be easily reconstructed from the feature map. However, reconstruction of the input datapoint may be difficult or highly cumbersome, if the reconstruction is attempted based on those features maps that may be determined as outputs of NN layers of the NN model 112 that are beyond or farther than a certain NN layer of the NN model 112. As discussed, this may be due to the reduction in similarity between the determined feature maps and the input datapoint. Thus, the comparison of the feature maps of the set of feature maps 406A, determined as outputs at each NN layer of the set of NN layers 114, with the received input datapoint may enable determination of a critical NN layer. The reconstruction of the received input datapoint from feature maps determined as outputs of NN layers beyond the critical NN layer may be highly complex or difficult.

At 410, an operation of first NN sub-model determination may be executed. The circuitry 202 may be configured to determine the first NN sub-model 112A including the first sub-set of NN layers 114A of the set of NN layers 114, based on the comparison. The feature map determined from each NN layer of the set of NN layers 114 may be compared with the received input datapoint to determine the critical NN layer. The NN layers of the set of NN layers 114 that may be positioned earlier than the determined critical NN layer of the NN model 112 and the determined critical NN layer may constitute the first NN sub-model 112A. The first NN sub-model 112A may include the first sub-set of NN layers 114A. In an embodiment, the first sub-set of NN layers 114A may correspond to a set of feature extractor layers of the NN model 112. It may be appreciated that the set of feature extractor layers may extract the features of the input datapoint. In other words, the set of feature extractor layers may transform the input datapoint into a set of features, such as edges, corners, and textures, that may provide dimensionally reduced non-redundant information of the input datapoint. Details related to the determination of the first NN sub-model 112A are further provided, for example, in FIG. 6A.

In an embodiment, the circuitry 202 may be configured to re-size each feature map of the determined set of feature maps 406A to generate a set of re-sized feature maps. Each feature map may be re-sized to a size of the received input datapoint. It may be appreciated that each feature map of the determined set of feature maps 406A may be dimensionally smaller than the size of the input datapoint. In an example, the input datapoint may be an input tensor and each feature map of the determined set of feature maps 406A may also be a tensor. Therefore, for comparison purposes, each tensor (i.e., each feature map of the determined set of feature maps 406A) may be re-sized to the size of the input tensor associated with the received input datapoint. For example, the input tensor may be an image tensor if the input datapoint is a tensor.

Once the tensors are of equal size, the circuitry 202 may be configured to execute a constructability test on each re-sized feature map of the set of re-sized feature maps (i.e., tensors) based on the received input datapoint (i.e., the input tensor). The constructability test may be performed to determine a degree of similarity of each re-sized feature map of the set of re-sized feature maps and the received input datapoint. The determination of the first NN sub-model 112A may be further based on the degree of similarity of a re-sized first feature map of the set of feature maps 406A being lower than a predefined threshold. The first feature map may be generated as an output of the critical NN layer. It may be appreciated that the constructability test may be performed on a re-sized feature map to determine whether the received input datapoint may be reconstructed from the re-sized feature map. The performance of the constructability test on each re-sized feature map may correspond to a determination of degree of similarity of each re-sized feature map with the received input datapoint. A magnitude of the degree of similarity of a re-sized feature map greater than a predefined threshold may indicate that the re-sized feature map may be similar to the received input datapoint. Based on such an indication, it may be determined that the received input datapoint may be reconstruct from, or using, the re-sized feature map. On the other hand, based on a determination that the magnitude of the degree of similarity of the re-sized feature map is less than the predefined threshold, it may be determined that reconstruction of the received input datapoint from the re-sized feature map may be complex or may not be possible at all.

In an embodiment, the constructability test may correspond to at least one of determination of a structural similarity index measure (SSIM), a correlation analysis, or a distance measurement based on an output of the pre-trained face recognition neural network. The SSIM may be used to determine a structural similarity between each re-sized feature map of the set of re-sized feature maps and the received input datapoint. Herein, in order to determine the SSIM between a re-sized feature map (generated as an output of a $K^{th}$" NN layer) and the received input datapoint, each of the re-sized feature map and the input datapoint may be segmented into "$M^2$" grids. The size of each grid may be such that each of the re-sized feature map and the input datapoint is segmented into "M" rows and "M" columns. Thereafter, the SSIM may be determined for each grid according to equation (1) as follows:

$$SSIM(x, y) = \frac{(2\mu_x\mu_y + C_1)(2\sigma_{xy} + C_2)}{(\mu_x^2 + \mu_y^2 + C_1)(\mu_x^2 + \mu_y^2 + C_2)} \quad (1)$$

where, "x" may be a grid that may include a set of pixels of the received input datapoint;

"y" may be a grid that may include a set of pixels of the re-sized feature map;

"$\mu_x$" may be a mean of the set of pixels (for example, mean of intensity of the set of pixels) included in the grid "x";

"$\mu_y$" may be a mean of the set of pixels (for example, mean of intensity of the set of pixels) included in the grid "y";

"$\sigma_{xy}$" may be a covariance of the set of pixels included in the grid "x" and the set of pixels included in the grid "y"; and "$C_1$" and "$C_2$" may be division stabilization variables.

Similarly, an SSIM may be determined for each of the other grids of "$M^2$" grids of the input datapoint and the re-sized feature map. In an embodiment, an overall SSIM between the input datapoint and the re-sized feature map may be obtained based on a computation of an average of the SSIMs determined for each of the "$M^2$" grids of the input datapoint and the re-sized feature map. Similarly, an overall SSIM between each of the other re-sized feature maps of the set of feature maps and the received input datapoint may be determined. The overall SSIM between a re-sized feature map and the input datapoint may correspond to the magnitude of the degree of similarity between the re-sized feature map and the input datapoint.

Therefore, the final SSIM, determined for each re-sized feature map of the set of re-sized feature maps may be compared with the predefined threshold. If the determined overall SSIM between the received input datapoint and a re-sized feature map, generated as an output of a NN layer (such as the "Kth" NN layer), is below the predefined threshold, then the re-sized feature map may be determined as dissimilar. Based on such a determination, the "Kth" NN layer may be determined as the critical NN layer. It me be noted that a re-sized feature map generated as an output "(K−1)th" NN layer may be determined as similar to the input datapoint. Therefore, the set of NN layers 114 may be segmented such that, the first sub-set of NN layers 114A may include the critical NN layer (i.e., the "Kth" NN layer) and the NN layers of the set of NN layers 114 of the NN model 112 prior to the critical layer (i.e., from the input NN layer to the "(K−1)th" NN layer). The first sub-set of NN layers 114A may constitute the first NN sub-model 112A.

In an embodiment, the constructability test may correspond to the correlation analysis. Herein, a correlation coefficient such as, Pearson's correlation coefficient between each re-sized feature map of the set of re-sized feature maps and the received input datapoint may be determined. A value of Pearson's correlation coefficient, determined for a re-sized feature map may indicate the magnitude of the degree of similarity between the re-sized feature map and the received input datapoint. The value of Pearson's correlation coefficient determined for each re-sized feature map may be compared with the predefined threshold. A first NN layer of the set of NN layers 114 for which the value of the Pearson's correlation coefficient may be less than the predefined threshold may be determined as the critical NN layer. Thereafter, the first NN sub-model 112A constituting the first subset of NN layers 114A including the critical NN layer may be determined. The critical NN layer may be the output layer of the first NN sub-model 112A.

In an embodiment, the constructability test may correspond to the distance measurement performed based on the output of the pre-trained face recognition neural network. Herein, each re-sized feature map of the set of re-sized feature maps and the received input datapoint may be fed as an input to the pre-trained face recognition neural network. The pre-trained face recognition neural network may recognize a reference face from the received input datapoint. Thereafter, the pre-trained face recognition neural network may recognize a face from each re-sized feature map of the set of re-sized feature maps. An Euclidean distance or a cosine similarity between the face recognized from each re-sized feature map of the set of re-sized feature maps and the reference face may be determined. The determined Euclidean distance or the cosine similarity may be compared with the predefined threshold. The circuitry 202 may determine a re-sized feature map from which a face is recognized, and the Euclidean distance or the cosine similarity between the recognized face and the reference face is less than the predefined threshold. Thereafter, a first NN layer, from which a feature map of the set of feature maps 406A is generated, may be determined. The determined re-sized feature map may be obtained based on resizing of the feature map generated as an output of the determined first NN layer. The first NN layer may be determined as the critical NN layer. Thereafter, the first NN sub-model 112A including the set of NN layers 114 may be determined based on the determined critical NN layer.

At 412, an operation of first NN sub-model application may be executed. The circuitry 202 may be configured to apply the determined first NN sub-model 112A on the received input datapoint. Upon determination of the first NN sub-model 112A, the received input datapoint may be applied to the input NN layer of the determined first NN sub-model 112A. For example, the image data corresponding to the received input datapoint may be applied as an input to the input NN layer of the determined first NN sub-model 112A.

In an embodiment, the circuitry 202 may be further configured to control storage of the first NN sub-model 112A on the first electronic device 102. As discussed, the feature maps obtained as outputs of the first sub-set of NN layers 114A included in the first NN sub-model 112A may be used to reconstruct the received input datapoint. Thus, in an event of a data theft (i.e., theft of the input datapoint or the feature maps), the personal information included in the input datapoint may be compromised based on retrieval of the personal information from the input datapoint or a reconstruction of the personal information from the feature maps. Therefore, the first NN sub-model 112A may need to be secured. Hence, the first NN sub-model 112A may be stored on the first electronic device 102, which may be a local device in the possession of the user 120 (and not transmitted to the second electronic device 104, which may be a remote device, such as, a server/cloud storage).

At 414, an operation of first feature map determination may be executed. The circuitry 202 may be configured to determine a first feature map based on the applied first NN sub-model 112A. Once the first NN sub-model 112A is determined, the received input datapoint may be applied to the input NN layer of the first NN sub-model 112A. Thereafter, the first feature map may be determined as an output of the critical NN layer based on the application of the first NN sub-model 112A.

At 416, an operation of first feature map transmission may be executed. The circuitry 202 may be configured to transmit the determined first feature map and information indicative of the second sub-set of NN layers 114B of the second NN sub-model 116 to the second electronic device 104. The second sub-set of NN layers 114B may correspond to NN layers other than the first sub-set of NN layers 114A of the NN model 112. The second NN sub-model 116 may be applied on the transmitted first feature map to determine a prediction output for the received input datapoint.

In an embodiment, the second set of NN layers 114B may correspond to a set of predictor layers of the NN model 112. That is, the second set of NN layers 114B may be used for execution of a prediction task. For example, the prediction task may be predicting a likelihood that the person associated with the received input datapoint may like a product. In case the second set of NN layers 114B corresponds to the set of predictor layers, then the second NN sub-model 116 may be applied on the transmitted first feature map to determine the prediction output for the received input datapoint.

In another embodiment, the second set of NN layers 114B may correspond to a set of recognition layers of the NN model 112. That is, the second set of NN layers 114B may be used for execution of a recognition task. For example, the recognition task may be face recognition. Based on the correspondence of the second set of NN layers 114B to the set of recognition layers, an application of the second NN sub-model 116 on the transmitted first feature map may result in a determination of a recognition output for the received input datapoint.

In another embodiment, the second set of NN layers 114B may correspond to a set of classifier layers of the NN model 112. That is, the second set of NN layers 114B may be used for execution of a classification task. For example, the classification task may involve classification of various objects included in an image that may correspond to the received input datapoint. Based on the correspondence of the second set of NN layers 114B to the set of classifier layers, an application of the second NN sub-model 116 on the transmitted first feature map may result in a determination of a classification output for the received input datapoint.

In an embodiment, the circuitry 202 may be further configured to control a storage of the second NN sub-model 116 on the second electronic device 104. The second NN sub-model 116 may be applied on the transmitted first feature map for the determination of the prediction output.

The second subset of NN layers 114B may be transmitted to the second electronic device 104 since reconstruction of the input datapoint from the transmitted first feature map may be complex or may not be possible. In an event of data theft i.e., theft of the first feature map or feature maps that may be obtained from the second sub-set of NN layers 114B, personal information may not be compromised.

In an embodiment, the circuitry 202 may be further configured to determine a feature extraction loss and a reconstructability loss based on the comparison of the determined first feature map and received input datapoint. The circuitry 202 may be further configured to transmit, to the second electronic device 104, the determined feature extraction loss and the reconstructability loss. The determination of the prediction output for the received input datapoint may be based on the transmitted feature extraction loss and the reconstructability loss. It may be appreciated that extraction of feature maps from the received input datapoint may lead to loss of information included in the received input datapoint. The loss may be due to compression of information included the received input datapoint. Therefore, the feature extraction loss, which may indicate loss of data due to compression of information during a process of feature extraction, may be determined. Further, the reconstructability loss may indicate instances of information loss when the received input datapoint is reconstructed from the determined first feature map. The feature extraction loss and the reconstructability loss may be determined based on the comparison of the determined first feature map and received input datapoint. The determined feature extraction loss and the determined reconstructability loss may be transmitted to the second electronic device 104 for the determination of the prediction output for the received input datapoint.

At 418, an operation of prediction output reception may be executed. The circuitry 202 may be configured to receive the determined prediction output from the second electronic device 104. The circuitry 302 of the second electronic device 104 may apply the input NN layer of the second NN sub-model 116 on the transmitted first feature map for determination of the prediction output. For example, the prediction output (e.g., the prediction output 418A) may be an emotion of the person (e.g., the user 120) included in an image corresponding to the received input datapoint. The second electronic device 104 may transmit the determined prediction output to the first electronic device 102.

At 420, an operation of rendering of the received prediction output may be executed. The circuitry 202 may be configured to control rendering of the received prediction output on a display device, such as the display device 210. Upon reception of the determined prediction output from the second electronic device 104, the circuitry 202 may render of the received prediction output on the display device 210. For example, the prediction output may be an emotion of the person. The emotion of the person may be predicted as "angry" and a message such as, "the person X is angry" may be rendered on the display device 210.

A person having ordinary skill in the art will understand that the steps 402 to 420 may be executed by the circuitry 202 during a training phase associated with the determination of the first NN sub-model 112A and determination of the second sub-set of NN layers 114B. However, during an inference phase, the circuitry 202 may use the first NN sub-model 112A stored on the first electronic device 102 to determine a feature map for a new input media content based on an application of the first NN sub-model 112A on the new input media content, according to steps 412 and 414. In the inference phase, steps 404, 406, 408, and 410 may not be performed. A person skilled in the art will appreciate that the transmission of the determined feature map associated with the new input media content (at step 416) may be performed during the inference phase. However, the transmission of the information indicative of the second sub-set of NN layers 114B of the second NN sub-model 116 may not be required as the second electronic device 104 may already store the second sub-set of NN layers 114B once the training phase completes. Thus, during the inference phase, the feature map associated with the new input media content may be determined (as per steps 412 and 414), the determined feature map may be transmitted to the second electronic device 104 (as per step 416), and a prediction output may be received from the second electronic device 104 (i.e., the steps 418 and 420 may be performed).

In an embodiment, in an inference phase, the circuitry 202 may be configured to receive a test datapoint including personal information of a person. The test datapoint may be a datapoint including datatypes similar to datatypes of the input datapoint. For example, in case the input datapoint includes an image, the test datapoint may also correspond to an image. In other examples, the test datapoint may correspond to a video, an audio, or a textual datapoint in case the input datapoint corresponds to a video, an audio, or a textual datapoint, respectively. The reception of the test datapoint may be similar to the input datapoint reception operation, as described at 402.

The circuitry 202 may be configured apply the determined first NN sub-model 112A on the received test datapoint. The application of the first NN sub-model on the received test datapoint may be similar to the first NN sub-model application operation, as described at 412. Further, the circuitry 202 may be configured to determine a second feature map based on the application of the first NN sub-model 112A on the received test datapoint. The determination of the second feature map may be similar to the first feature map determination operation, as described at 414.

The circuitry 202 may be further configured to transmit the determined second feature map to the second electronic device 104. The second NN sub-model 116 may be applied on the transmitted second feature map to determine a test prediction output for the received test datapoint. In an embodiment, the second electronic device 104 may be configured to apply the second NN sub-model 116 on the transmitted second feature map to determine the test prediction output for the received test datapoint. The circuitry 202 may be configured to receive the test prediction output from the second electronic device 104. The determination of the test prediction output and the reception of the test prediction output are described at 418, with reference to the determination and reception of the prediction output associated with the input datapoint. Further, the circuitry 202 may control rendering of the received test prediction output on a display device (for example, the display device 210).

A person having ordinary skill in the art will also understand that the feature extraction loss and the reconstructability loss may only be determined during the training phase and not during the inference phase. Further, the feature extraction loss and the reconstructability loss may only be transmitted to the second electronic device 104 during the training phase and not during the inference phase.

The disclosed first electronic device 102 may automate a search for determination of the critical NN layer. Further, based on the determined critical NN layer, the disclosed first electronic device 102 may split the NN model 112 into the first NN sub-model 112A and the second NN sub-model 116. The first subset of NN layers 114A of the first NN sub-model 112A may receive, as an input, the input datapoint or feature maps from which the input datapoint may be extracted. The first subset of NN layers 114A of the first NN sub-model 112A may generate, as an output, feature maps from which the input datapoint may be extracted. Thus, the first subset of NN layers 114A may process the personal information associated with the user 120. The first NN sub-model 112A may be executed on the first electronic device 102 and may not be transmitted to external devices (such as the second electronic device 104) to prevent proliferation of the personal information in the external devices, ensure that privacy of the personal information is not compromised, and any potential theft of the personal information is prevented. The first NN sub-model 112A may be executed on the first electronic device 102 since the first electronic device 102 may be an end-user system that may be associated with the user 120.

The second NN sub-model 116 may process non-personal information and may be stored on a remote system, such as, the second electronic device 104. Further, the disclosed first electronic device 102 may eliminate a need to redesign the existing NN models in order to adhere to the privacy laws enforced in different jurisdictions and constraints required to deal with the personal information. The elimination of the need to redesign the existing NN models may concomitantly eliminate the need to employ a domain expert to redesign the existing NN models. Moreover, the splitting of the NN model 112 may not lead to any deterioration of existing efficiency of the NN models. On the contrary, an overall efficiency of the first NN sub-model 112A and the second NN sub-model 116 may be similar or more that an efficiency of the NN model 112. That is, the prediction output determined based on splitting the NN model 112 in to the first NN sub-model 112A and the second NN sub-model 116 may be similar to the prediction output that may be determined from the NN model 112. Further, the splitting of the NN model 112 may enable user-end devices with memory, latency, or processing constraints, to perform complex ML tasks since a portion of the NN model 112, i.e., the second NN sub-model 116, may be stored in the second electronic device 104, which may not be as constrained as the user-end devices.

Figure 5:
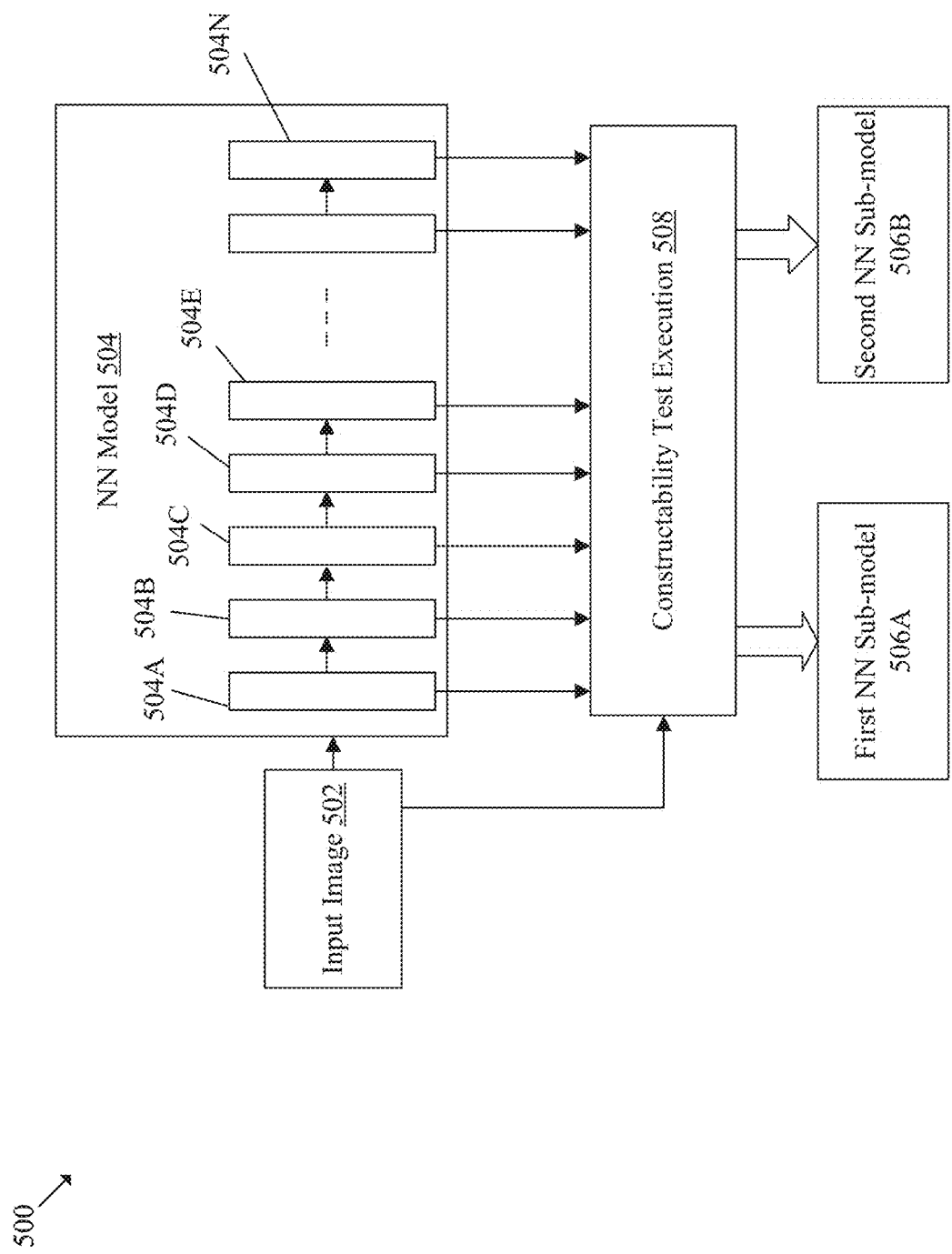
FIG. 5 is a diagram that illustrates an exemplary scenario for splitting of an NN model into a first NN sub-model and a second NN sub-model, in accordance with an embodiment of the disclosure.

FIG. 5 is a diagram that illustrates an exemplary scenario for splitting of an NN model into a first NN sub-model and a second NN sub-model, in accordance with an embodiment of the disclosure. FIG. 5 is described in conjunction with elements from FIG. 1, FIG. 2, FIG. 3, and FIG. 4. With reference to FIG. 5, there is shown an exemplary scenario 500. In the exemplary scenario 500, there is shown an input image 502, a NN model 504, a first NN sub-model 506A, and a second NN sub-model 506B. The NN model 504 may include a set of NN layers, viz., a NN layer 504A, a NN layer 504B, a NN layer 504C, a NN layer 504D, a NN layer 504E . . . and a NN layer 504N.

The N number of NN layers shown in FIG. 5 are presented merely as an example. The NN model 504 may include only two or more than N number of NN layers, without deviation from the scope of the disclosure. For the sake of brevity, only N number of NN layers have been shown in FIG. 5. However, in some embodiments, there may be more than N number of NN layers without limiting the scope of the disclosure. FIG. 5 further includes an operation 508 that may be executed by any computing system, for example, by the first electronic device 102 of FIG. 1 or by the circuitry 202 of FIG. 2. A set of operations associated with the scenario 500 is described herein.

At any time-instance, the circuitry 202 may apply an input NN layer of the NN model 504 on the input image 502. The input NN layer may be the NN layer 504A. The NN layer 504A may process the input image 502 and generate a first feature map. The circuitry 202 may further apply the NN layer 504B on the first feature map. for generation of a second feature map. Such application of an NN layer on a feature map generated as an output of a previous NN layer may continue until the NN layer 504N. That is, for any "Kth" NN layer, a feature map, generated as an output of a previous NN layer, i.e., a "(K−1)th" NN layer may be provided as an input. The NN layer 504N may generate the prediction output. The size of a feature map determined as an output of each NN layer may be lesser compared to the size of input image 502. Hence, each generated feature may be re-sized based on the size of input image 502 for comparison of a corresponding feature map with the input image 502.

Upon re-sizing the feature map determined from each layer, at 508, an operation of constructability test execution may be executed. Herein, the constructability test may be applied on each re-sized feature map to determine the degree of similarity of the corresponding re-sized feature map with the received input image 502. It may be noted that the degree of similarity of each re-sized feature map and the received input image 502 feature map may reduce for NN layers of the NN model 504 farther from the input NN layer, i.e., the NN layer 504A. For example, a first degree of similarity may be determined between the first re-sized feature map (generated as the output of the NN layer 504A) and the received input image 502. A second degree of similarity may be determined between the second re-sized feature map (generated as the output of the NN layer 504B) and the received input image 502. Similarly, a third degree of similarity may be determined between a third re-sized feature map (determined from the NN layer 504C) and the received input image 502. The third re-sized feature map may be generated based on an application of the NN layer 504C on the second re-sized feature map. The first degree of similarity may be greater than the second degree of similarity, and the second degree of similarity may be greater than the third degree of similarity. Thus, reconstruction of the input image 502 from the first feature map may be simpler as compared to that from the second feature map The circuitry 202 may further determine a critical NN layer of the NN model 504 such that reconstruction of input image 502 from a feature map generated as an output of a NN layer succeeding the critical NN layer may be impossible or difficult.

With reference to FIG. 5, in an example, the critical NN layer may be determined as the NN layer 504E. The circuitry 202 may then split the NN model 504 into the first NN sub-model 506A and the second NN sub-model 506B such that the first NN sub-model 506A may include a first sub-set of NN layers and the second NN sub-model 506B may include a second sub-set of NN layers. The first sub-set of NN layers may include the NN layer 504A, the NN layer 504B, the NN layer 504C, the NN layer 504D, and the NN layer 504E. The second sub-set of NN layers may include NN layers starting from an NN layer 504F to the NN layer 504N. As the input image 502 may be reconstructed from the feature maps generated as outputs of the first NN sub-model 506A, there may be a need to be secure the first NN sub-model 506A. Thus, the first NN sub-model 506A may be stored on the first electronic device 102, which may be a local computing device of the user 120. As input image 502 may not be possible to be reconstructed from the feature maps generated as outputs of the second NN sub-model 506B, the second NN sub-model 506B may be transmitted to and stored in the second electronic device 104.

It should be noted that scenario 500 of FIG. 5 is for exemplary purposes and should not be construed to limit the scope of the disclosure.

Figure 6A:
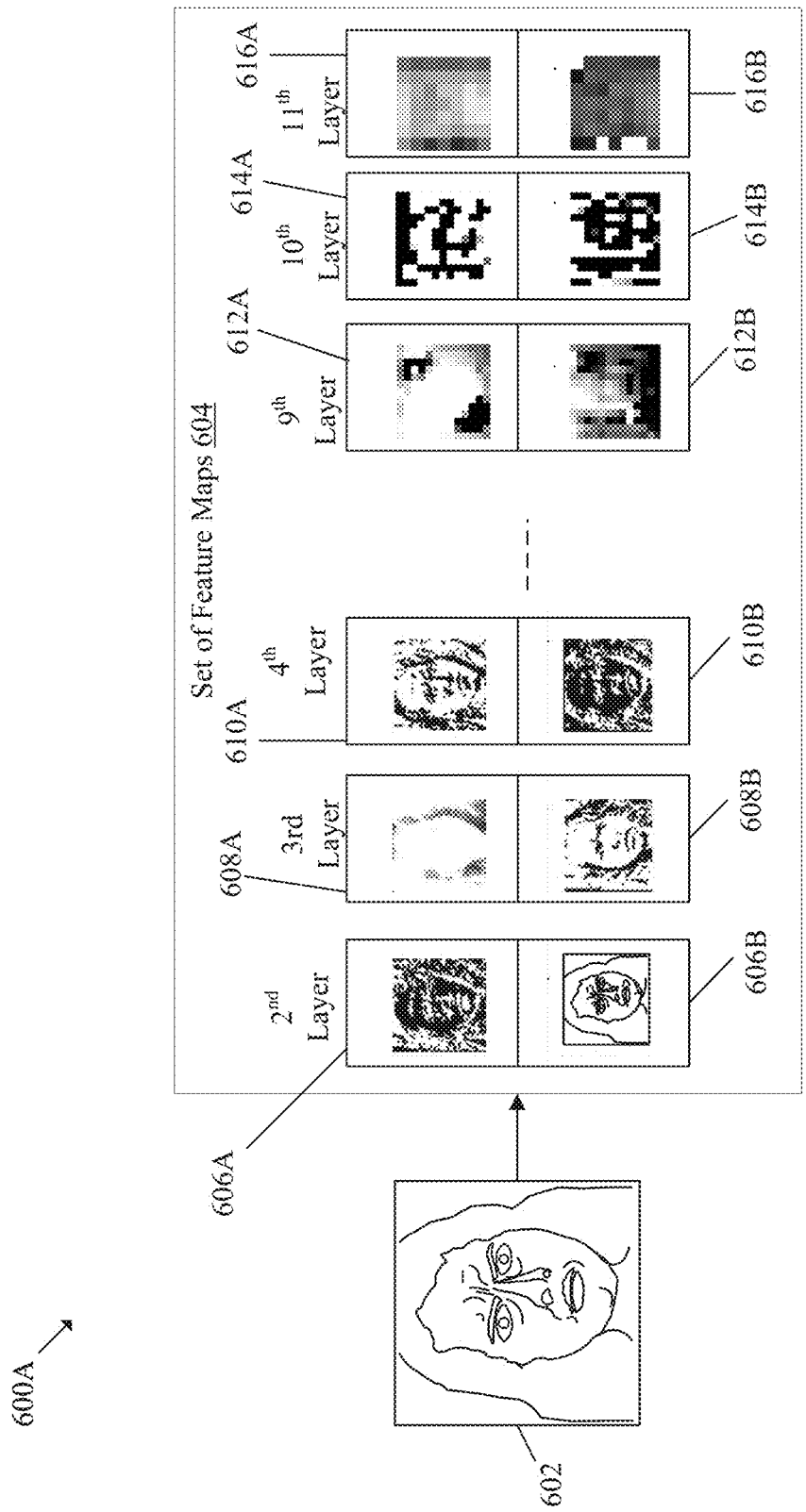
FIG. 6A is a diagram that illustrates an exemplary scenario for identification of a critical NN layer of an NN model based on a set of feature maps, in accordance with an embodiment of the disclosure.

FIG. 6A is a diagram that illustrates an exemplary scenario for identification of a critical NN layer of an NN model based on a set of feature maps, in accordance with an embodiment of the disclosure. FIG. 6A is described in conjunction with elements from FIG. 1, FIG. 2, FIG. 3, FIG. 4, and FIG. 5. With reference to FIG. 6A, there is shown an exemplary scenario 600A. In the exemplary scenario 600A there is shown an input image 602 and a set of feature maps 604. The set of feature maps 604 may include eleven pairs of feature maps. Each pair of feature maps may be generated by an NN layer of an NN model. The set of feature maps 604 may include a feature map 606A, a feature map 606B, a feature map 608A, a feature map 608B, a feature map 610A, a feature map 610B, a feature map 612A, a feature map 612B, a feature map 614A, a feature map 614B, a feature map 616A, and a feature map 616B. A set of operations associated the with exemplary scenario 600A is described herein.

With reference to FIG. 6A, an NN model, such as the NN model 112 of FIG. 1, may be applied on the input image 602. In the present scenario, the input image 602 may be fed as an input to a first NN layer (i.e., the input NN layer) of the NN model 112. Based on the input, an output of the input NN layer, i.e., a first feature map, may be generated. The first feature map may be fed as an input to a second NN layer of the NN model 112. An output of the second NN layer of the NN model 112 may be the feature map 606A and the feature map 606B. The feature map 606A and the feature map 606B may be fed as an input to a third NN layer of the NN model 112. An output of the third NN layer of the NN model 112 may be the feature map 608A and the feature map 608B. Such feeding of inputs to the NN layers and generation of outputs from the NN layers may continue until an eleventh NN layer of the NN model 112. For example, the output of a fourth NN layer of the NN model 112 may be the feature map 610A and the feature map 610B. The output of a ninth NN layer of the NN model 112 may be the feature map 612A and the feature map 612B. The output of a tenth NN layer of the NN model 112 may be the feature map 614A and the feature map 614B. The output of an eleventh NN layer of the NN model 112 may be the feature map 616A and the feature map 616B.

With reference to FIG. 6A, it may be observed that each of the feature maps generated from the ninth NN layer onwards, for example, may have a lower degree of similarity with the input image 602, such that it may be impossible to reconstruct the input image 602 from such feature maps. Therefore, the ninth NN layer may be determined as the critical NN layer for the NN model 112. Thus, the NN model 112 may be split such that, the NN layers from the input NN layer to the ninth NN layer may be included in the first NN sub-model (such as, the first NN sub-model 112A of FIG. 4).

The NN layers including and after the tenth NN layer may be included in the second NN sub-model (such as, the second NN sub-model 116 of FIG. 1).

It should be noted that scenario 600A of FIG. 6A is for exemplary purposes and should not be construed to limit the scope of the disclosure.

Figure 6B:
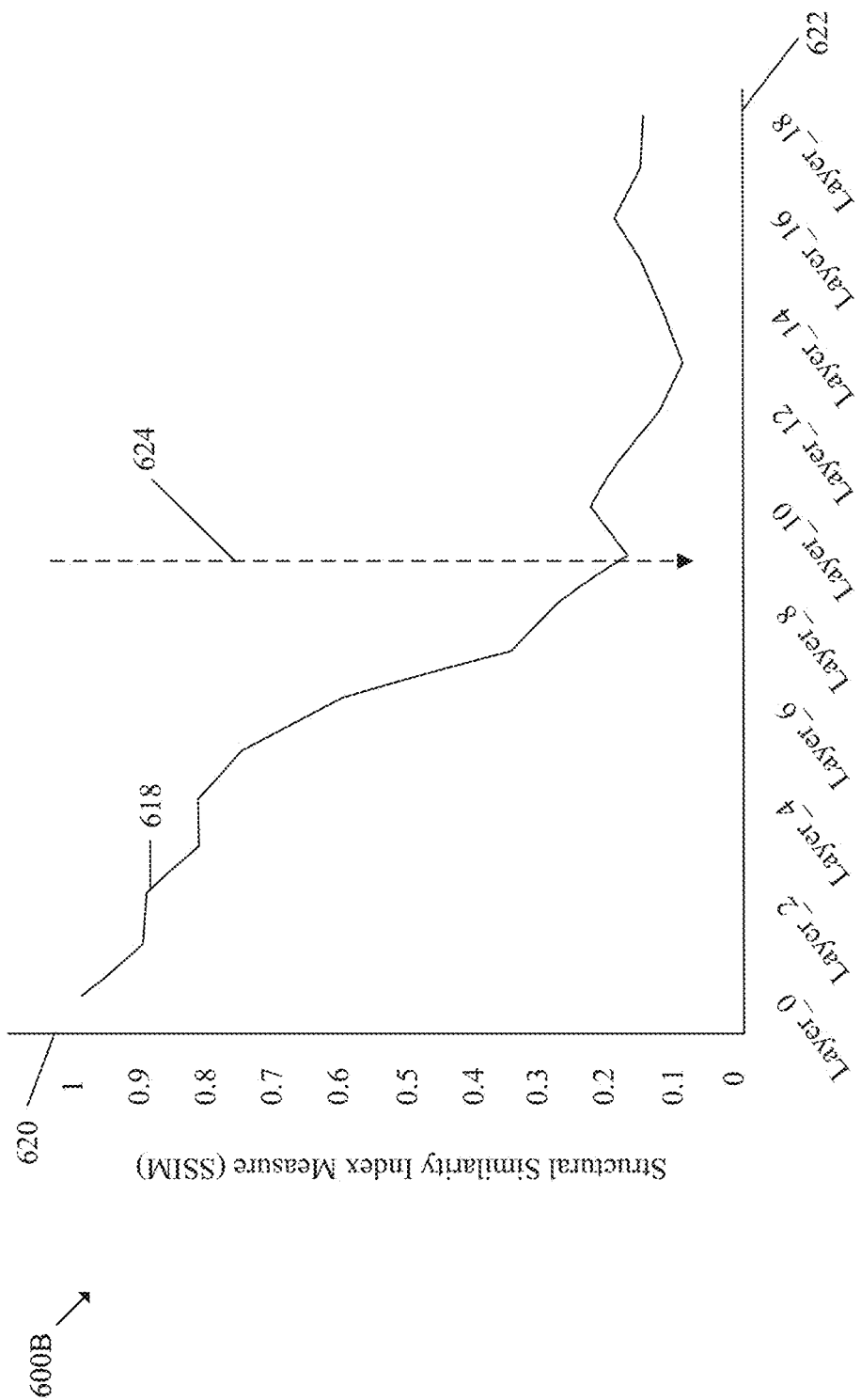
FIG. 6B is a diagram that illustrates an exemplary scenario of a graph indicative of a variation of a structural similarity index measure (SSIM) for feature maps generated by NN layers of an NN model, in accordance with an embodiment of the disclosure.

FIG. 6B is a diagram that illustrates an exemplary scenario of a graph indicative of a variation of SSIM for feature maps generated by NN layers of an NN model, in accordance with an embodiment of the disclosure. FIG. 6B is described in conjunction with elements from FIG. 1, FIG. 2, FIG. 3, FIG. 4, FIG. 5, and FIG. 6A. With reference to FIG. 6B, there is shown an exemplary scenario 600B. In the exemplary scenario 600B there is shown a graph 618. The graph 618 may be generated based on values of SSIM that may be determined between each re-sized feature map of a set of re-sized feature maps and the received input datapoint. A Y-axis 620 of the graph 618 may represent a range of values (for example, between a range of 0-1) of SSIM. An X-axis 622 of the graph 618 may represent a set of NN layers (for example, 18 NN layers) of an NN model. The graph 618 may further include a vertical line 624 that may indicate a splitting of the NN model based on a determination of a critical NN layer of the NN.

In an embodiment, the circuitry 202 may be configured to compare each feature map of a set of feature maps (for example, eighteen feature maps) with an input datapoint. The set of feature maps may be generated as outputs of the set of NN layers. Each feature map of the set of feature maps may be re-sized to a size of the input datapoint, prior to the comparison. For the comparison, an overall SSIM may be determined between each re-sized feature map and the input datapoint. The overall SSIM may be compared with a predefined threshold (for example, "0.15"). It may be determined that the SSIM between each of the re-sized feature maps generated based on feature map outputs of NN layers_0-8 and the input datapoint may be greater than "0.15" (i.e., the predefined threshold). Further, the SSIM between a re-sized feature map generated based on a feature map output of the NN layer 9 (and above) and the input datapoint may be less than "0.15" (as indicated by the vertical line 624). Thus, NN layer "layer_9" may be determined as the critical NN layer. Based on the determination of the critical NN layer, the NN model 112 may be split such that, the NN layers, starting from the NN "layer_0" to the NN "layer_9" may be included in the first NN sub-model (such as, the first NN sub-model 112A of FIG. 1). The NN layers from the NN "layer_10" to the NN "layer_18" may be included in the second NN sub-model (such as the second NN sub-model 116 of FIG. 1).

It should be noted that scenario 600B of FIG. 6B is for exemplary purposes and should not be construed to limit the scope of the disclosure.

Figure 7:
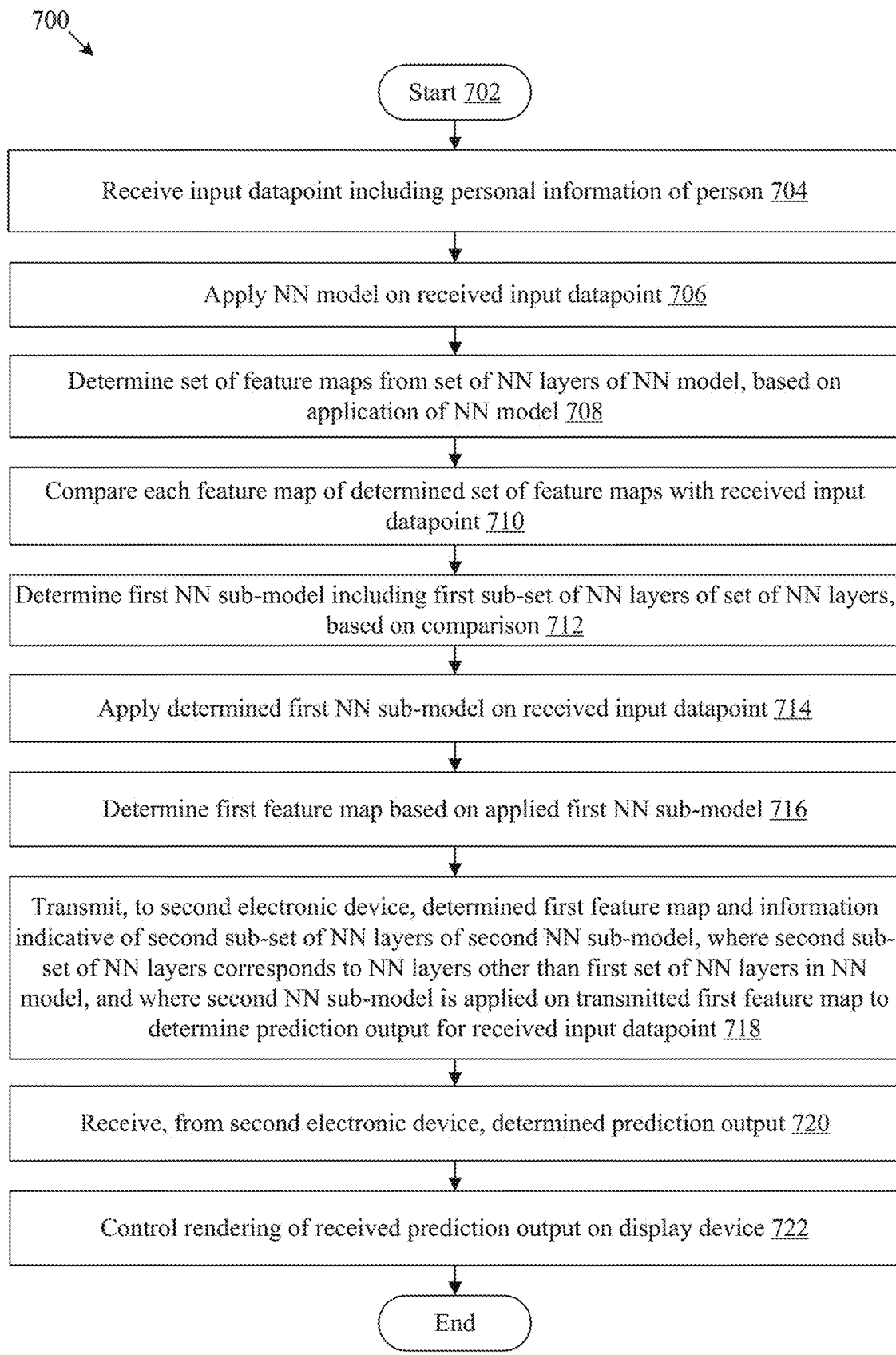
FIG. 7 is a flowchart that illustrates operations of an exemplary method for privacy-preserving splitting of neural network models for prediction across multiple devices, in accordance with an embodiment of the disclosure.

FIG. 7 is a flowchart that illustrates operations of an exemplary method for privacy-preserving splitting of neural network models for prediction across multiple devices, in accordance with an embodiment of the disclosure. FIG. 7 is described in conjunction with elements from FIG. 1, FIG. 2, FIG. 3, FIG. 4, FIG. 5, FIG. 6A, and FIG. 6B. With reference to FIG. 7, there is shown a flowchart 700. The flowchart 700 may include operations from 702 to 722 and may be implemented by the first electronic device 102 of FIG. 1 or by the circuitry 202 of FIG. 2. The flowchart 700 may start at 702 and proceed to 704.

At 704, the input datapoint such as, the media content-1 118A, including personal information of the person, such as the user 120, may be received. The circuitry 202 may be configured to receive the input datapoint, such as the media content-1 118A, including the personal information of the person, such as the user 120. Details related to the reception of the input datapoint are further described, for example, in FIG. 4 (at 402).

At 706, the NN model 112 may be applied on the received input datapoint. The circuitry 202 may be configured to apply the NN model 112 on the received input datapoint. Details related to application of the NN model 112 are further described, for example, in FIG. 4 (at 404).

At 708, the set of feature maps 406A may be determined from the set of NN layers 114 of the NN model 112, based on the application of the NN model 112. The circuitry 202 may be configured to determine the set of feature maps 406A from the set of NN layers 114 of the NN model 112, based on the application of the NN model 112. Details related to the determination of the set of feature maps 406A are further described, for example, in FIG. 4 (at 406).

At 710, each feature map of the determined set of feature maps 406A may be compared with the received input datapoint. The circuitry 202 may be configured to compare each feature map of the determined set of feature maps 406A with the received input datapoint. Details related to the comparison of each feature map are further described, for example, in FIG. 4 (at 408).

At 712, the first NN sub-model 112A including the first sub-set of NN layers 114A of the set of NN layers 114 may be determined based on the comparison. The circuitry 202 may be configured to determine the first NN sub-model 112A including the first sub-set of NN layers 114A of the set of NN layers 114, based on the comparison. Details related to determination of the first NN sub-model 112A are further described, for example, in FIG. 4 (at 410).

At 714, the determined first NN sub-model may be applied on the received input datapoint. The circuitry 202 may be configured to apply the determined first NN sub-model on the received input datapoint. Details related to the application of the determined first NN sub-model are further described, for example, in FIG. 4 (at 412).

At 716, the first feature map may be determined based on the applied first NN sub-model 112A. The circuitry 202 may be configured to determine the first feature map based on the applied first NN sub-model 112A. Details related to the determination of the first feature map are further described, for example, in FIG. 4 (at 414).

At 718, the determined first feature map and the information indicative of the second sub-set of NN layers 114B of the second NN sub-model 116 may be transmitted to the second electronic device 104. Herein, the second sub-set of NN layers 114B may correspond to NN layers other than the first sub-set of NN layers 114A of the NN model 112, and the second NN sub-model 116 may be applied on the transmitted first feature map to determine the prediction output for the received input datapoint. The circuitry 202 may be configured to transmit, to the second electronic device 104, the determined first feature map and information indicative of the second sub-set of NN layers 114B of the second NN sub-model 116. In an embodiment, the second sub-set of NN layers 114B may correspond to NN layers other than the first sub-set of NN layers 114A of the NN model 112. The second NN sub-model 116 may be applied on the transmitted first feature map to determine the prediction output for the received input datapoint. Details related to the transmission of the first feature map and the information indicative of the second sub-set of NN layers are further described, for example, in FIG. 4 (at 416).

At 720, the determined prediction output may be received from the second electronic device 104. The circuitry 202 may be configured to receive the determined prediction output from the second electronic device 104. In an embodiment, the second electronic device 104 may receive the determined first feature map and the information indicative of the second sub-set of NN layers 114B of the second NN sub-model 116. The second electronic device 104 may generate and/or deploy the second NN sub-model 116 based on the received information indicative of the second sub-set of NN layers 114B. Thereafter, the second electronic device 104 may apply the generated and/or deployed second NN sub-model 116 on the received first feature map (which is output from the critical NN layer of the NN model 112). Based on the application of the second NN sub-model 116 on the received first feature map, the second electronic device 104 may determine the prediction output associated with the input datapoint. For example, the input datapoint may be an image of a person and the prediction task to be performed by the NN model 112 may be to determine an emotional state of the user 120, based on the image in the input datapoint. In such case, the prediction output may correspond to an emotion (for example, a surprised emotion) corresponding to the image of the user 120 in the input datapoint. Details related to the reception of the determined prediction output are further described, for example, in FIG. 4 (at 418).

At 722, rendering of the received prediction output on the display device 210 may be controlled. The circuitry 202 may be configured to control the rendering of the received prediction output on the display device 210. Details related to the rendering of the received prediction output are further described, for example, in FIG. 4 (at 420). Control may pass to end.

Although the flowchart 700 is illustrated as discrete operations, such as, 704, 706, 708, 710, 712, 714, 716, 718, 720, and 722 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a first electronic device (for example, the first electronic device 102 of FIG. 1). Such instructions may cause the first electronic device 102 to perform operations that may include reception of an input datapoint (such as, the media content-1 118A) including personal information of a person, (such as, the user 120). The operations may further include application of a neural network (NN) model (e.g., the NN model 112) on the received input datapoint. The operations may further include determination of a set of feature maps (e.g., the set of feature maps 406A) from a set of NN layers (e.g., the set of NN layers 114) of the NN model 112, based on the application of the NN model 112. The operations may further include comparison of each feature map of the determined set of feature maps 406A with the received input datapoint. The operations may further include determination of a first NN sub-model (e.g., the first NN sub-model 112A) including a first sub-set of NN layers (e.g., the first sub-set of NN layers 114A) of the set of NN layers 114, based on the comparison. The operations may further include application of the determined first NN sub-model 112A on the received input datapoint. The operations may further include determination of a first feature map based on the applied first NN sub-model 112A. The operations may further include transmission of the determined first feature map and information indicative of a second sub-set of NN layers (e.g., the second sub-set of NN layers 114B) of a second NN sub-model (e.g., the second NN sub-model 116) to a second electronic device (e.g., the second electronic device 104). The second sub-set of NN layers 114B may correspond to NN layers other than the first sub-set of NN layers 114A of the NN model 112, and the second NN sub-model 116 may be applied on the transmitted first feature map to determine the prediction output for the received input datapoint. The operations may further include receipt of the determined prediction output from the second electronic device 104. The operations may further include controlling a rendering of the received prediction output on a display device (e.g., the display device 210).

Exemplary aspects of the disclosure may provide a first electronic device (such as, the first electronic device 102 of FIG. 1) that includes circuitry (such as, the circuitry 202). The circuitry 202 may be configured to receive the input datapoint (such as, the media content-1 118A) including the personal information of a person (such as, the user 120). The circuitry 202 may be configured to apply a neural network (NN) model (e.g., the NN model 112) on the received input datapoint. The circuitry 202 may be configured to determine a set of feature maps (e.g., the set of feature maps 406A) from a set of NN layers (e.g., the set of NN layers 114) of the NN model 112, based on the application of the NN model 112. The circuitry 202 may be configured to compare each feature map of the determined set of feature maps 406A with the received input datapoint. The circuitry 202 may be further configured to determine a first NN sub-model (e.g., the first NN sub-model 112A) including a first sub-set of NN layers (e.g., the first sub-set of NN layers 114A) of the set of NN layers 114, based on the comparison. The circuitry 202 may be further configured to apply the determined first NN sub-model 112A on the received input datapoint. The circuitry 202 may be further configured to determine the first feature map based on the applied first NN sub-model 112A. The circuitry 202 may be configured to transmit the determined first feature map and information indicative of a second sub-set of NN layers (e.g., the second sub-set of NN layers 114B) of a second NN sub-model (e.g., the second NN sub-model 116) to a second electronic device (e.g., the second electronic device 104). The second sub-set of NN layers 114B may correspond to NN layers other than the first sub-set of NN layers 114A of the NN model 112. The second NN sub-model 116 may be applied on the transmitted first feature map to determine the prediction output for the received input datapoint. The circuitry 202 may be further configured to receive the determined prediction output from the second electronic device 104. The circuitry 202 may be configured to control a rendering of the received prediction output on a display device (e.g., the display device 210).

In an embodiment, the received input datapoint (such as, the media content-1 118A) may correspond to at least one of image data, video data, textual data, or audio data.

In an embodiment, the circuitry 202 may be further configured to control a storage of the first NN sub-model 112A on the first electronic device 102. The circuitry 202 may be further configured to the control a storage of the second NN sub-model 116 on the second electronic device 104.

In an embodiment, the first sub-set of NN layers 114 may correspond to a set of feature extractor layers of the NN model 112.

In an embodiment, the second set of NN layers 114B may correspond to a set of predictor layers of the NN model 112.

In an embodiment, the personal information corresponding to the received input datapoint may be stored on the first electronic device 102.

In an embodiment, the non-personal information corresponding to the first feature map may be stored on the second electronic device 104.

In an embodiment, the circuitry 202 may be further configured to re-size each feature map of the determined set of feature maps 406A based on the size of the received input datapoint. The circuitry 202 may be further configured to execute a constructability test on each of the re-sized set of feature maps based on the received input datapoint to determine the degree of similarity of each of the re-sized set of feature maps and the received input datapoint. The determination of the first NN sub-model 112A may be further based on a degree of similarity of the first feature map of the set of feature maps being lower than the predefined threshold.

In an embodiment, the constructability test may correspond to at least one of: an SSIM, a correlation analysis, or a pre-trained face recognition neural network.

In an embodiment, the circuitry 202 may be further configured to determine a feature extraction loss and a reconstructability loss based on the comparison of the determined first feature map and received input datapoint. The circuitry 202 may be further configured to transmit, to the second electronic device 104, the determined feature extraction loss and the reconstructability loss. The determination of the prediction output for the received input datapoint may be further based on the transmitted feature extraction loss and the reconstructability loss.

In an embodiment, the circuitry 202 may be configured to receive a test datapoint including personal information of a person. The circuitry 202 may be configured apply the determined first NN sub-model 112A on the received test datapoint. Further, the circuitry 202 may be configured to determine a second feature map based on the application of the first NN sub-model 112A on the received test datapoint. The circuitry 202 may be further configured to transmit the determined second feature map to the second electronic device 104. The second NN sub-model 116 may be applied on the transmitted second feature map to determine a test prediction output for the received test datapoint. In an embodiment, the second electronic device 104 may be configured to apply the second NN sub-model 116 on the transmitted second feature map to determine the test prediction output for the received test datapoint. The circuitry 202 may be configured to receive the test prediction output from the second electronic device 104. Further, the circuitry 202 may control rendering of the received test prediction output on a display device (for example, the display device 210).

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A first electronic device, comprising:
circuitry configured to:
receive an input datapoint including personal information of a person;
apply a neural network (NN) model on the received input datapoint;
determine a set of feature maps from a set of NN layers of the NN model, based on the application of the NN model;
compare each feature map of the determined set of feature maps with the received input datapoint;
determine a first NN sub-model including a first sub-set of NN layers of the set of NN layers, based on the comparison;
apply the determined first NN sub-model on the received input datapoint;
determine a first feature map of the determined set of feature maps based on the applied first NN sub-model;
transmit, to a second electronic device, the determined first feature map and information indicative of a second sub-set of NN layers of a second NN sub-model, wherein
the second sub-set of NN layers corresponds to NN layers other than the first sub-set of NN layers of the NN model, and
the second NN sub-model is applied on the transmitted first feature map to determine a prediction output for the received input datapoint;
receive, from the second electronic device, the determined prediction output; and
control rendering of the received prediction output on a display device.

2. The first electronic device according to claim 1, wherein the received input datapoint corresponds to at least one of image data, video data, textual data, or audio data.

3. The first electronic device according to claim 1, wherein the circuitry is further configured to:
control a storage of the first NN sub-model on the first electronic device; and
control a storage of the second NN sub-model on the second electronic device.

4. The first electronic device according to claim 1, wherein the first sub-set of NN layers corresponds to a set of feature extractor layers of the NN model.

5. The first electronic device according to claim 1, wherein the second sub-set of NN layers corresponds to a set of predictor layers of the NN model.

6. The first electronic device according to claim 1, wherein the personal information corresponding to the received input datapoint is stored on the first electronic device.

7. The first electronic device according to claim 1, wherein non-personal information corresponding to the first feature map is stored on the second electronic device.

8. The first electronic device according to claim 1, wherein the circuitry is further configured to:
   re-size each feature map of the determined set of feature maps based on a size of the received input datapoint; and
   execute a constructability test on each of the re-sized set of feature maps based on the received input datapoint to determine a degree of similarity of each of the re-sized set of feature maps and the received input datapoint, wherein
      the determination of the first NN sub-model is further based on the degree of similarity of the first feature map of the set of feature maps being lower than a predefined threshold.

9. The first electronic device according to claim 8, wherein the constructability test corresponds to at least one of a structural similarity index measure (SSIM), a correlation analysis, or a pre-trained face recognition neural network.

10. The first electronic device according to claim 1, wherein the circuitry is further configured to:
   determine a feature extraction loss and a reconstructability loss based on the comparison of the determined first feature map and received input datapoint; and
   transmit, to the second electronic device, the determined feature extraction loss and the reconstructability loss, wherein
      the determination of the prediction output for the received input datapoint is further based on the transmitted feature extraction loss and the reconstructability loss.

11. The first electronic device according to claim 1, wherein the circuitry is further configured to:
   receive a test datapoint including personal information of a person;
   apply the determined first NN sub-model on the received test datapoint;
   determine a second feature map based on the application of the first NN sub-model on the received test datapoint;
   transmit, to the second electronic device, the determined second feature map, wherein
      the second NN sub-model is applied on the transmitted second feature map to determine a test prediction output for the received test datapoint;
   receive, from the second electronic device, the test prediction output; and
   control rendering of the received test prediction output on the display device.

12. A method, comprising:
   in a first electronic device:
      receiving an input datapoint including personal information of a person;
      applying a neural network (NN) model on the received input datapoint;
      determining a set of feature maps from a set of NN layers of the NN model, based on the application of the NN model;
      comparing each feature map of the determined set of feature maps with the received input datapoint;
      determining a first NN sub-model including a first sub-set of NN layers of the set of NN layers, based on the comparison;
      applying the determined first NN sub-model on the received input datapoint;
      determining a first feature map of the determined set of feature maps based on the applied first NN sub-model;
      transmitting, to a second electronic device, the determined first feature map and information indicative of a second sub-set of NN layers of a second NN sub-model, wherein
         the second sub-set of NN layers corresponds to NN layers other than the first sub-set of NN layers of the NN model, and
         the second NN sub-model is applied on the transmitted first feature map to determine a prediction output for the received input datapoint;
      receiving, from the second electronic device, the determined prediction output; and
      controlling rendering of the received prediction output on a display device.

13. The method according to claim 12, further comprising:
   controlling a storage of the first NN sub-model on the first electronic device; and
   controlling a storage of the second NN sub-model on the second electronic device.

14. The method according to claim 12, wherein the first sub-set of NN layers corresponds to a set of feature extractor layers of the NN model.

15. The method according to claim 12, wherein the second sub-set of NN layers corresponds to a set of predictor layers of the NN model.

16. The method according to claim 12, wherein the personal information corresponding to the received input datapoint is stored on the first electronic device.

17. The method according to claim 12, wherein non-personal information corresponding to the first feature map is stored on the second electronic device.

18. The method according to claim 12, further comprising:
   re-sizing each feature map of the determined set of feature maps based on a size of the received input datapoint; and
   executing a constructability test on the re-sized feature map based on the received input datapoint to determine a degree of similarity of the re-sized feature map and the received input datapoint, wherein
      the identification of the first feature map is further based on the degree of similarity of the first feature map being lower than a predefined threshold.

19. The method according to claim 18, wherein the constructability test corresponds to at least one of a structural similarity index measure (SSIM), a correlation analysis, or a pre-trained face recognition neural network.

20. A non-transitory computer-readable medium having stored thereon, computer-executable instructions that when executed by a first electronic device, causes the electronic device to execute operations, the operations comprising:
   receiving an input datapoint including personal information of a person;
   applying a neural network (NN) model on the received input datapoint;
   determining a set of feature maps from a set of NN layers of the NN model, based on the application of the NN model;
   comparing each feature map of the determined set of feature maps with the received input datapoint;
   determining a first NN sub-model including a first sub-set of NN layers of the set of NN layers, based on the comparison;

applying the determined first NN sub-model on the received input datapoint;
determining a first feature map of the determined set of feature maps based on the applied first NN sub-model;
transmitting, to a second electronic device, the determined first feature map and information indicative of a second sub-set of NN layers of a second NN sub-model, wherein
  the second sub-set of NN layers corresponds to NN layers other than the first sub-set of NN layers of the NN model, and
  the second NN sub-model is applied on the transmitted first feature map to determine a prediction output for the received input datapoint;
receiving, from the second electronic device, the determined prediction output; and
controlling rendering of the received prediction output on a display device.

* * * * *